(12) United States Patent
Hobbis et al.

(10) Patent No.: US 11,242,586 B2
(45) Date of Patent: Feb. 8, 2022

(54) SYSTEMS AND METHODS FOR THREADING A HOT COIL ON A MILL

(71) Applicant: NOVELIS INC., Atlanta, GA (US)

(72) Inventors: Andrew James Hobbis, Bath (CA); Antoine Jean Willy Pralong, Granges (CH); Stephen Lee Mick, Fairmont, WV (US); Rodger Brown, Atlanta, GA (US); Mark Finn, Kennesaw, GA (US); Peter Knelsen, Roswell, GA (US); Terry Lee, Kennesaw, GA (US); Hansjuerg Alder, Feuerthalen (CH); William Beck, Bowling Green, KY (US); Roberto Quintal, Woodstock, GA (US); Natasha Iyer, Marietta, GA (US); Jeffrey Edward Geho, Marietta, GA (US)

(73) Assignee: Novelis Inc., Atlanta, GA (US)

( * ) Notice: Subject to any disclaimer, the term of this patent is extended or adjusted under 35 U.S.C. 154(b) by 160 days.

(21) Appl. No.: 16/448,316

(22) Filed: Jun. 21, 2019

(65) Prior Publication Data
US 2019/0309403 A1     Oct. 10, 2019

Related U.S. Application Data

(62) Division of application No. 15/717,698, filed on Sep. 27, 2017, now Pat. No. 10,370,749.

(Continued)

(51) Int. Cl.
*B21B 39/02* (2006.01)
*C22F 1/04* (2006.01)
(Continued)

(52) U.S. Cl.
CPC ............... *C22F 1/04* (2013.01); *B21B 39/02* (2013.01); *B21B 39/34* (2013.01); *B21C 47/16* (2013.01);
(Continued)

(58) Field of Classification Search
CPC . B21B 2015/0064; B21B 39/02; B21B 39/06; B21B 39/14; B21B 39/16;
(Continued)

(56) References Cited

U.S. PATENT DOCUMENTS

| | | |
|---|---|---|
| 1,872,045 A | 8/1932 | Smitmans |
| 2,001,637 A | 5/1935 | Talbot |

(Continued)

FOREIGN PATENT DOCUMENTS

| | | |
|---|---|---|
| CN | 1190361 A | 8/1998 |
| CN | 1389879 | 1/2003 |

(Continued)

OTHER PUBLICATIONS

Translation, SU 1005958 A1; Mar. 1983.*

(Continued)

*Primary Examiner* — Edward T Tolan
(74) *Attorney, Agent, or Firm* — Kilpatrick Townsend & Stockton LLP

(57) ABSTRACT

Systems and methods of threading a metal substrate on a rolling mill include receiving a coil of the metal substrate. The method also includes uncoiling the metal substrate from the coil while the coil and guiding the metal substrate to a work stand of the rolling mill with a threading system.

8 Claims, 14 Drawing Sheets

Related U.S. Application Data

(60) Provisional application No. 62/400,426, filed on Sep. 27, 2016, provisional application No. 62/505,948, filed on May 14, 2017.

(51) Int. Cl.

| | |
|---|---|
| *B21C 47/18* | (2006.01) |
| *B21C 47/34* | (2006.01) |
| *H05B 6/10* | (2006.01) |
| *B21C 47/16* | (2006.01) |
| *B65H 29/00* | (2006.01) |
| *B65H 29/20* | (2006.01) |
| *B21D 22/02* | (2006.01) |
| *B21D 37/16* | (2006.01) |
| *C21D 1/42* | (2006.01) |
| *F27D 99/00* | (2010.01) |
| *H05B 6/32* | (2006.01) |
| *H05B 6/36* | (2006.01) |
| *B21B 39/34* | (2006.01) |
| *B21C 37/02* | (2006.01) |
| *C21D 1/04* | (2006.01) |
| *C22C 21/02* | (2006.01) |
| *C22C 21/06* | (2006.01) |
| *C22C 21/10* | (2006.01) |
| *C22C 21/12* | (2006.01) |
| *B65G 54/02* | (2006.01) |
| *C22F 1/02* | (2006.01) |
| *H02N 15/00* | (2006.01) |
| *F27D 19/00* | (2006.01) |

(52) U.S. Cl.
CPC .......... *B21C 47/18* (2013.01); *B21C 47/3433* (2013.01); *B21C 47/3483* (2013.01); *B21D 22/022* (2013.01); *B21D 37/16* (2013.01); *B65H 29/006* (2013.01); *B65H 29/20* (2013.01); *C21D 1/42* (2013.01); *F27D 99/0001* (2013.01); *H05B 6/104* (2013.01); *H05B 6/32* (2013.01); *H05B 6/36* (2013.01); *B21C 37/02* (2013.01); *B65G 54/02* (2013.01); *C21D 1/04* (2013.01); *C22C 21/02* (2013.01); *C22C 21/06* (2013.01); *C22C 21/10* (2013.01); *C22C 21/12* (2013.01); *C22F 1/02* (2013.01); *F27D 2019/0003* (2013.01); *H02N 15/00* (2013.01); *Y02P 10/25* (2015.11)

(58) Field of Classification Search
CPC . B21B 39/24; B21B 2273/06; B21B 2273/08; B21C 47/16; B21C 47/18; B21C 47/3433
See application file for complete search history.

(56) References Cited

U.S. PATENT DOCUMENTS

| | | |
|---|---|---|
| 2,041,235 A | 5/1936 | Darbaker |
| 2,058,447 A | 10/1936 | Hazelett |
| 2,058,448 A | 10/1936 | Hazelett |
| 2,092,480 A * | 9/1937 | Talbot ................ B21B 39/16 72/160 |
| RE21,260 E | 11/1939 | Hazelett |
| 2,334,109 A | 11/1943 | McBain et al. |
| 2,448,009 A | 8/1948 | Baker |
| 2,448,012 A | 8/1948 | Baker |
| 2,481,172 A | 9/1949 | Staggs |
| 2,494,399 A * | 1/1950 | McCleary ............ B21C 47/34 72/166 |
| 2,527,237 A | 10/1950 | Wilcox, Jr. |
| 2,529,884 A | 11/1950 | Reynolds |
| 2,566,274 A | 8/1951 | White et al. |
| 2,722,589 A | 11/1955 | Marquardt |
| 2,731,212 A | 1/1956 | Baker |
| 2,753,474 A | 7/1956 | Walworth et al. |
| 2,769,932 A | 11/1956 | Zozulin et al. |
| 2,895,034 A | 7/1959 | Baffrey et al. |
| 2,912,552 A | 11/1959 | Baermann |
| 3,008,026 A | 11/1961 | Kennedy |
| 3,184,938 A | 5/1965 | Terwiliger |
| 3,218,001 A * | 11/1965 | Gombos ............ B21C 47/3433 242/559.4 |
| 3,272,956 A | 9/1966 | Baermann |
| 3,376,120 A | 4/1968 | Hiegel |
| 3,438,231 A | 4/1969 | Petzschke |
| 3,444,346 A | 5/1969 | Russell et al. |
| 3,453,847 A | 7/1969 | Romanauskas |
| 3,535,902 A | 10/1970 | Sevenich et al. |
| 3,562,470 A | 2/1971 | Bobart et al. |
| 3,604,696 A | 9/1971 | Coleman et al. |
| 3,635,417 A | 1/1972 | Kajiwara et al. |
| 3,746,229 A | 7/1973 | Feller et al. |
| 3,793,867 A | 2/1974 | Safford |
| 3,837,391 A | 9/1974 | Rossi |
| 3,879,814 A * | 4/1975 | Mojelski ................ F16B 2/10 294/116 |
| 4,019,359 A | 4/1977 | Smith |
| 4,054,770 A | 10/1977 | Jackson et al. |
| 4,138,074 A | 2/1979 | Ross et al. |
| 4,185,183 A | 1/1980 | Kamimoto |
| 4,214,467 A | 7/1980 | Sankaran |
| 4,296,919 A | 10/1981 | Sakurai et al. |
| 4,321,444 A | 3/1982 | Davies |
| 4,379,396 A | 4/1983 | Hope et al. |
| 4,448,614 A | 5/1984 | Morimoto et al. |
| 4,485,651 A | 12/1984 | Tippins et al. |
| 4,520,645 A | 6/1985 | Ross et al. |
| 4,708,325 A | 11/1987 | Georges |
| 4,730,781 A | 3/1988 | Richter et al. |
| 4,743,196 A | 5/1988 | Imose et al. |
| 4,761,527 A | 8/1988 | Mohr |
| 4,795,872 A | 1/1989 | Hagisawa et al. |
| 4,828,227 A | 5/1989 | Georges et al. |
| 4,891,484 A | 1/1990 | Waggott et al. |
| 4,923,396 A | 5/1990 | Harada et al. |
| 5,356,495 A | 10/1994 | Wyatt-Mair et al. |
| 5,397,877 A | 3/1995 | Couffet et al. |
| 5,401,941 A | 3/1995 | Mauve et al. |
| 5,701,775 A | 12/1997 | Sivilotti et al. |
| 5,727,412 A | 3/1998 | Tippins et al. |
| 5,739,506 A | 4/1998 | Hanton et al. |
| 5,914,056 A | 6/1999 | Yamaguchi |
| 5,914,065 A | 6/1999 | Alavi |
| 6,011,245 A | 1/2000 | Bell |
| 6,019,200 A | 2/2000 | Janzen et al. |
| 6,129,136 A | 10/2000 | Tibbs et al. |
| 6,264,765 B1 | 7/2001 | Bryant et al. |
| 6,285,015 B1 | 9/2001 | Doizaki et al. |
| 6,327,883 B1 | 12/2001 | Noe et al. |
| 6,570,141 B2 | 5/2003 | Ross |
| 6,576,878 B2 | 6/2003 | Thorpe et al. |
| 6,776,857 B2 | 8/2004 | Lee |
| 7,525,073 B2 | 4/2009 | Lovens et al. |
| 7,671,307 B2 | 3/2010 | Nikanorov et al. |
| 7,819,356 B2 | 10/2010 | Takatsuka et al. |
| 7,926,316 B2 * | 4/2011 | Tachibana ............ B21B 37/74 72/8.5 |
| 7,942,191 B2 | 5/2011 | Zhang et al. |
| 8,502,122 B2 | 8/2013 | Hirota |
| 8,592,735 B2 | 11/2013 | Hirota |
| 9,089,887 B2 * | 7/2015 | Snyder ................ B21C 47/3433 |
| 9,248,482 B2 | 2/2016 | Passoni et al. |
| 9,462,641 B2 | 10/2016 | Akers |
| 2006/0037989 A1 | 2/2006 | Zilkenat et al. |
| 2006/0070689 A1 | 4/2006 | Kropfl |
| 2006/0123866 A1 | 6/2006 | Ho |
| 2007/0193322 A1 | 8/2007 | Beck et al. |
| 2009/0026303 A1 | 1/2009 | Schmitz et al. |
| 2009/0101636 A1 | 4/2009 | Lovens et al. |
| 2010/0050730 A1 | 3/2010 | Buschsieweke et al. |
| 2010/0237548 A1 | 9/2010 | Okada et al. |
| 2012/0074132 A1 | 3/2012 | Chen et al. |

(56) References Cited

U.S. PATENT DOCUMENTS

| | | | |
|---|---|---|---|
| 2014/0147697 | A1 | 5/2014 | Berkhout et al. |
| 2016/0016215 | A1 | 1/2016 | Brown et al. |
| 2016/0363164 | A1 | 12/2016 | Kosmicki et al. |
| 2018/0085805 | A1 | 3/2018 | Pralong et al. |
| 2018/0085810 | A1 | 3/2018 | Malpica et al. |
| 2018/0087122 | A1 | 3/2018 | Custers |
| 2018/0087138 | A1 | 3/2018 | Gaensbauer et al. |
| 2018/0092163 | A1 | 3/2018 | Pralong et al. |
| 2018/0092164 | A1 | 3/2018 | Gaensbauer et al. |

FOREIGN PATENT DOCUMENTS

| | | | | |
|---|---|---|---|---|
| CN | 1891363 | | 1/2007 | |
| CN | 101611316 | | 12/2009 | |
| CN | 100584986 | A | 1/2010 | |
| CN | 101795785 | | 8/2010 | |
| CN | 101821031 | A | 9/2010 | |
| CN | 201596682 | U | 10/2010 | |
| CN | 102378427 | A | 3/2012 | |
| CN | 102649129 | A | 8/2012 | |
| CN | 102921727 | A | 2/2013 | |
| CN | 104507190 | A | 4/2015 | |
| CN | 104537253 | A | 4/2015 | |
| CN | 104588430 | A | 5/2015 | |
| CN | 105073291 | A | 11/2015 | |
| CN | 105142813 | A | 12/2015 | |
| CN | 105189791 | A | 12/2015 | |
| CN | 105339101 | A | 2/2016 | |
| DE | 857787 | C | 12/1952 | |
| DE | 1163760 | B | 2/1964 | |
| DE | 4213686 | A1 * | 10/1993 | ..... B21B 2015/0064 |
| DE | 19650582 | A1 * | 6/1998 | ............ B21C 47/34 |
| DE | 102006054383 | A1 | 5/2008 | |
| DE | 102008061356 | | 6/2010 | |
| EA | 012474 | B1 | 10/2009 | |
| EP | 1221826 | B1 | 2/2006 | |
| EP | 1604549 | B1 | 8/2006 | |
| EP | 2112863 | A1 | 10/2009 | |
| EP | 2157193 | A1 | 2/2010 | |
| EP | 2233593 | A2 | 9/2010 | |
| EP | 2434836 | A2 | 3/2012 | |
| EP | 2478974 | A1 | 7/2012 | |
| EP | 2800452 | B1 | 7/2016 | |
| FR | 1347484 | A | 12/1963 | |
| FR | 1387653 | A | 1/1965 | |
| FR | 2780846 | B1 | 9/2000 | |
| GB | 167545 | A | 8/1921 | |
| GB | 600673 | A | 4/1948 | |
| GB | 609718 | A | 10/1948 | |
| GB | 988334 | A | 4/1965 | |
| GB | 2114101 | A | 8/1983 | |
| GB | 2121260 | A | 12/1983 | |
| JP | 4934459 | U | 3/1974 | |
| JP | 5168460 | A | 6/1976 | |
| JP | 5469557 | | 6/1979 | |
| JP | S56102567 | A | 8/1981 | |
| JP | S58193351 | A | 11/1983 | |
| JP | 58221609 | | 12/1983 | |
| JP | S6486474 | A | 3/1989 | |
| JP | 2-6008 | A * | 1/1990 | ............ B21B 39/14 |
| JP | 02209457 | A | 8/1990 | |
| JP | H02209457 | | 8/1990 | |
| JP | H0375344 | A | 3/1991 | |
| JP | H0375345 | A | 3/1991 | |
| JP | 04112485 | A | 4/1992 | |
| JP | 576932 | A | 3/1993 | |
| JP | 0527041 | | 4/1993 | |
| JP | 0582248 | A | 4/1993 | |
| JP | H0527042 | U | 4/1993 | |
| JP | 0549117 | U | 6/1993 | |
| JP | 05138305 | | 6/1993 | |
| JP | 05293605 | | 11/1993 | |
| JP | 0711402 | | 1/1995 | |
| JP | H07328719 | | 12/1995 | |
| JP | 09122752 | A | 5/1997 | |
| JP | 2002529245 | | 9/2002 | |
| JP | 2011200889 | | 10/2011 | |
| JP | 2012152824 | | 8/2012 | |
| JP | 2016141843 | A | 8/2016 | |
| KR | 20120116988 | A1 | 10/2012 | |
| RU | 1784319 | A1 | 12/1992 | |
| RU | 2333065 | | 9/2008 | |
| RU | 97889 | | 9/2010 | |
| RU | 2504574 | | 1/2014 | |
| RU | 2539962 | | 1/2015 | |
| SU | 1005958 | | 3/1983 | |
| SU | 1316725 | A1 | 6/1987 | |
| WO | 2007138152 | A1 | 12/2007 | |
| WO | 2010091865 | | 8/2010 | |
| WO | 2012050552 | | 4/2012 | |
| WO | 2012084638 | | 6/2012 | |
| WO | 2015094482 | A1 | 6/2015 | |
| WO | 2016035867 | A1 | 3/2016 | |
| WO | 2016035893 | A1 | 3/2016 | |

OTHER PUBLICATIONS

U.S. Appl. No. 15/717,698, "Supplemental Notice of Allowability", dated Jul. 2, 2019, 3 pages.
Canadian Application No. 3,012,495, "Office Action", dated Feb. 13, 2020, 4 pages.
Chinese Application No. 201780008470.4, "Notice of Decision to Grant", dated Nov. 29, 2019, 7 pages.
European Application No. 17783661.6, "Notice of Decision to Grant", dated Nov. 7, 2019, 2 pages.
Indian Application No. 201817026638, "First Examination Report", dated Oct. 22, 2019, 7 pages.
Mexican Application No. MX/A/2018/008898, "Notice of Allowance", dated Oct. 25, 2019, 2 pages.
Zerbetto, "Optimal Design of a Permanent Magnet Heater for Aluminum Billets", 2014 Flux Conference, Inovalab s.r.l., Oct. 15, 2014, 23 pages.
European Patent Application No. 19208050.5, "Extended European Search Report", dated Mar. 5, 2020, 3 pages.
"International Alloy Designations and Chemical Composition Limits for Wrought Aluminum and Wrought Aluminum Alloys," Registration Record Series: Teal Sheets, Feb. 1, 2009, The Aluminum Association, Inc., 35 pages.
Australian Patent Application No. AU2017335761, "First Examination Report", dated Sep. 18, 2018, 3 pages.
Canadian Patent Application No. CA3,012,495, "Office Action", dated May 23, 2019, 3 pages.
Chinese Patent Application No. CN201780008470.4, "Office Action", dated Apr. 15, 2019, 13 pages.
International Patent Application No. PCT/US2017/053813, "International Search Report and Written Opinion", dated Jan. 26, 2018, 15 pages.
Japanese Patent Application No. JP2018-538545, "Office Action", dated Jan. 8, 2019, 4 pages.
Korean Patent Application No. KR10-2018-7022261, "Office Action", dated Nov. 29, 2018, 11 pages.
Mexican Patent Application No. MX/a/2018/008898, "Office Action", dated Mar. 27, 2019, 5 pages.
Russian Patent Application No. RU2018126508, "Notice of Decision to Grant", dated Dec. 3, 2018, 18 pages.
U.S. Appl. No. 15/717,698, "Non-Final Office Action", dated Nov. 6, 2018, 11 pages.
U.S. Appl. No. 15/717,698, "Notice of Allowance", dated Mar. 22, 2019, 8 pages.
U.S. Appl. No. 16/448,324, First Action Interview Pilot Program Pre-Interview Communication, dated Apr. 5, 2021, 4 pages.
European Patent Application No. 19208050.5, Office Action, dated Dec. 16, 2020, 3 pages.
Brazilian Application No. 112018015294-3, Office Action, dated Jul. 20, 2021, 7 pages.
Chinese Application No. 202010092737.6, Office Action, dated Jun. 23, 2021, 24 pages.
U.S. Appl. No. 16/448,324, Non-Final Office Action, dated Jul. 6, 2021, 8 pages.

(56) References Cited

OTHER PUBLICATIONS

U.S. Appl. No. 16/448,330, Non-Final Office Action, dated Jul. 14, 2021, 7 pages.
Japanese Application No. 2019-118054, Office Action, dated Jun. 8, 2021, 9 pages.
Japanese Application No. 2019-118055, Office Action, dated Jun. 8, 2021, 8 pages.
Japanese Application No. 2019-118059, Office Action, dated Jun. 8, 2021, 7 pages.
U.S. Appl. No. 16/448,330, First Action Interview Pilot Program Pre-Interview Communication dated May 20, 2021, 4 pages.
European Application No. 19208050.5, Notice of Decision to Grant, dated Sep. 30, 2021, 2 pages.
Japanese Application No. 2019-118054, Office Action, dated Oct. 5, 2021, 5 pages.
Japanese Application No. 2019-118055, Office Action, dated Oct. 5, 2021, 5 pages.
Japanese Application No. 2019-118059, Office Action, dated Oct. 5, 2021, 6 pages.

* cited by examiner

SYSTEMS AND METHODS FOR THREADING A HOT COIL ON A MILL

CROSS REFERENCE TO RELATED APPLICATIONS

The present application is a division of U.S. patent application Ser. No. 15/717,698 entitled "SYSTEMS AND METHODS FOR THREADING A HOT COIL ON A MILL" and filed on Sep. 27, 2017, which claims the benefit of U.S. Provisional Patent Application No. 62/400,426 entitled "ROTATING MAGNET HEAT INDUCTION" and filed on Sep. 27, 2016, and U.S. Provisional Patent Application No. 62/505,948 entitled "ROTATING MAGNET HEAT INDUCTION" and filed on May 14, 2017, the disclosures of which are hereby incorporated by reference in their entireties.

Additionally, the present application is related to U.S. Non-provisional patent application Ser. No. 15/716,559 to Antoine Jean Willy Pralong et al., entitled "SYSTEMS AND METHODS FOR NON-CONTACT TENSIONING OF A METAL STRIP" filed Sep. 27, 2017, U.S. Non-provisional patent application Ser. No. 15/716,608 to David Anthony Gaensbauer et al., entitled "COMPACT CONTINUOUS ANNEALING SOLUTION HEAT TREATMENT" filed Sep. 27, 2017, and U.S. Non-provisional patent application Ser. No. 15/716,887 to Antoine Jean Willy Pralong et al., entitled "ROTATING MAGNET HEAT INDUCTION" filed Sep. 27, 2017, the disclosures of which are hereby incorporated by reference in their entireties.

FIELD OF THE INVENTION

This application relates to metal processing and, more particularly, to systems and methods for threading a coil of a metal substrate on a rolling mill.

BACKGROUND

During metal processing, sometimes a metal substrate is uncoiled from a coil of the metal substrate. However, the traditional method of uncoiling the metal substrate from the coil may cause damage such as scratching or other defects to the metal substrate.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some examples, a method of threading a metal substrate on a rolling mill includes receiving a coil of the metal substrate. The method also includes uncoiling the metal substrate from the coil. In various examples, the method includes guiding the metal substrate to a work stand of the rolling mill with a threading system.

According to certain examples, a system for threading a metal substrate on a rolling mill includes a threading carriage with a gripper configured to grip a metal substrate. In certain cases, the system also includes a track extending between an unwind mandrel and a work stand of the rolling mill. In some examples, the threading carriage is movable along the track, and the threading carriage is configured to guide and apply tension to the metal substrate between the unwind mandrel and the work stand.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
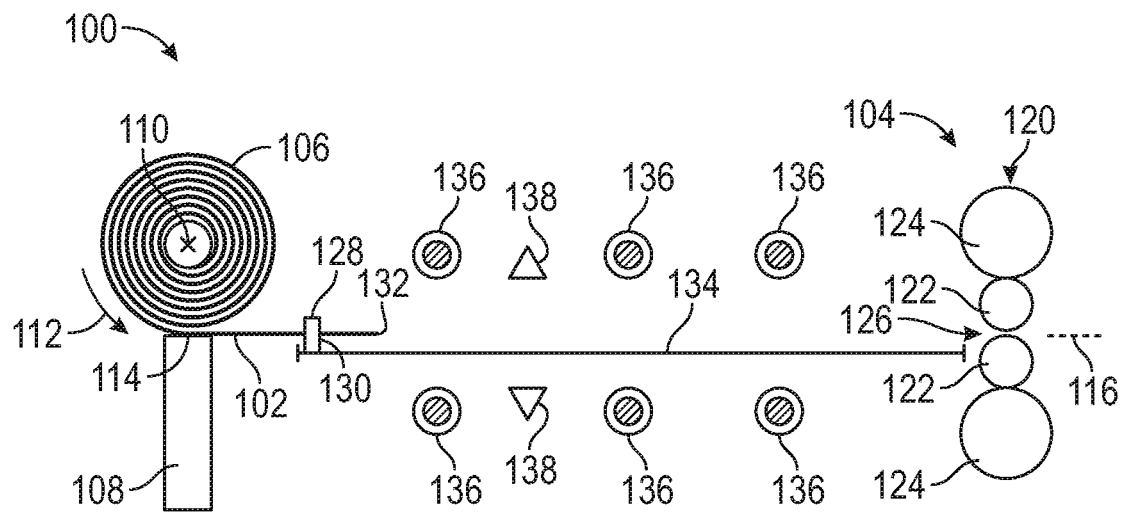
FIG. 1 is a schematic of a system for threading a coil on a mill according to aspects of the present disclosure.
Figure 2:
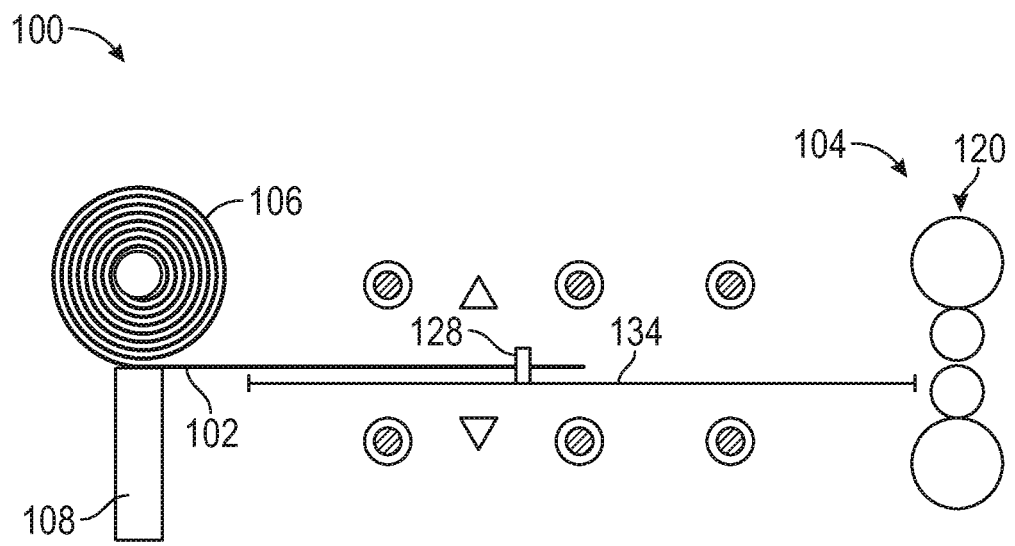
FIG. 2 is another schematic of the system FIG. 1.
Figure 3:
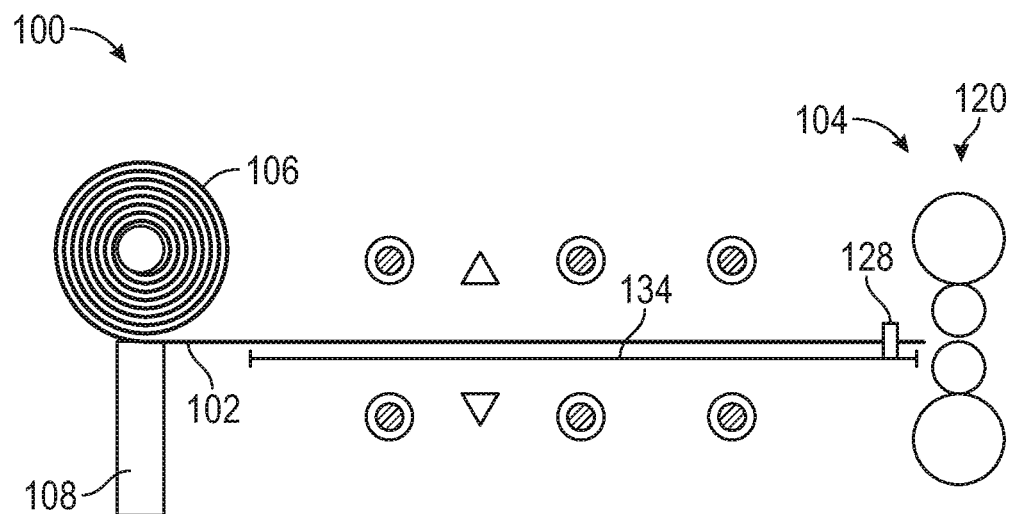
FIG. 3 is another schematic of the system of FIG. 1.

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Disclosed are systems and methods for threading a coil of a metal substrate on a mill. Aspects and features of the present disclosure can be used with coils of any suitable metal substrate, and may be especially useful with coils of aluminum or aluminum alloys. Specifically, desirable results can be achieved when uncoiling alloys such as 2xxx series, 3xxx series, 4xxx series, 5xxx series, 6xxx series, 7xxx series, or 8xxx series aluminum alloys. For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

In some cases, the systems and methods disclosed herein may be used with non-ferrous materials, including aluminum, aluminum alloys, magnesium, magnesium-based materials, titanium, titanium-based materials, copper, copper-based materials, steel, steel-based materials, bronze, bronze-based materials, brass, brass-based materials, composites, sheets used in composites, or any other suitable metal, non-metal or combination of materials. The article may include monolithic materials, as well as non-monolithic materials such as roll-bonded materials, clad materials, composite materials (such as but not limited to carbon fiber-containing materials), or various other materials. In one non-limiting example, the systems and methods can be used to heat metal articles such as aluminum metal strips, slabs, blanks, or other articles made from aluminum alloys, including aluminum alloys containing iron.

Aspects and features of the present disclosure can be used with coils of a metal substrate at any temperature, and may be especially useful with coils at elevated temperatures of at least 450° C. In other examples, aspects and features of the present disclosure can be used with coils of a metal substrate at a temperature less than 450° C., such as less than 100° C. For example, in some cases, aspects and features of the present disclosure can be used with coils of a metal substrate at room temperature that are to be heated or hot metal substrate at a temperature below 450° C. that is to be cooled down. As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

An example of a threading system 100 for threading a metal substrate 102 from a coil 106 on a rolling mill 104 is illustrated in FIGS. 1-4.

The rolling mill 104 includes at least one work stand 120. In some examples, the rolling mill 104 includes a plurality of work stands 120, such as two work stands 120, three work stands 120, four work stands 120, or any other desired number of work stands 120. The work stand 120 includes a pair of vertically aligned work rolls 122. In some examples, the work stand 120 also includes backup rolls 124 that support the pair of work rolls 122. In various examples, the work stand 120 also includes intermediate rolls. A roll gap 126 is defined between the work rolls 122.

During processing, the metal substrate 102 is passed through the roll gap 126 such that the work rolls 122 reduce the thickness of the metal substrate 102 to a desired thickness and impart particular properties on the metal substrate 102. The particular properties imparted may depend on the composition of the metal substrate 102. In some examples, the rolling mill 104 may be a hot rolling mill that is configured to roll the metal substrate 102 when the temperature of the metal substrate 102 is above the recrystallization temperature of the metal substrate 102. In other examples, the rolling mill 104 may be a cold rolling mill that is configured to roll the metal substrate 102 when the temperature of the metal substrate 102 is below the recrystallization temperature of the metal substrate 102. In various other examples, the rolling mill 104 may be a warm rolling mill that is configured to roll the metal substrate 102 when the temperature of the metal substrate 102 is below the recrystallization temperature but above the temperature during cold rolling.

In various examples, the coil 106 is supported on an unwind mandrel 108. In some cases, the unwind mandrel 108 is a predetermined distance from the work stand 120. In certain non-limiting examples, the predetermined distance from the work stand 120 to the unwind mandrel 108 is less than about 20 meters, such as less than about 15 meters, such as less than about 10 meters. In some examples, the predetermined distance is from about 3 meters to about 5 meters. In other examples, the predetermined distance is greater than about 20 meters. The predetermined distance may be changed depending on the metal substrate to be processed, a desired mill setup, or various other considerations.

In some examples, the unwind mandrel 108 is configured to receive and/or support the coil 106 while the coil 106 is at an elevated temperature. In some examples, the elevated temperature is greater than 450° C., although it need not be. In some cases, the elevated temperature is from about 450° C. to about 560° C. In other examples, the elevated temperature is greater than 560° C. In certain cases, the elevated temperature is less than a melting point of the metal substrate. In one example where the metal substrate 102 is aluminum or an aluminum alloy, the elevated temperature is less than a melting point of the aluminum or aluminum alloy. In various examples, it may be beneficial to use elevated coil temperatures to achieve an elevated roll entry temperature at a work stand of a rolling mill (such as a temperature greater than 500° C., among others). Elevated coil temperatures may also be used so that the coils can be rolled directly from a homogenization furnace. In other examples, the coil 106 may be less than 450° C. In certain examples, the coil 106 may be at room temperature or various other temperatures less than 450° C.

The unwind mandrel 108 defines an axis of rotation 110 about which the coil 106 is rotated to unwind the metal substrate 102. In the threading system 100 illustrated in FIGS. 1-4, the coil 106 is mounted on the unwind mandrel 108 such that the coil 106 is rotated in the direction indicated by arrow 112 to uncoil the metal substrate 102. Uncoiling in the direction indicated by arrow 112 is generally known as "under-winding." In the under-winding configuration, an unroll point 114, or the point where the metal substrate 102 separates from the coil 106, is per definition below the axis of rotation 110. In various examples, uncoiling the metal substrate 102 by under-winding allows for the weight of the outermost layer of the coil 106 to hold the remainder of the coil 106 tightly on the unwind mandrel 108. Under-winding may also allow for the outermost layer of the coil 106 (also known as the outer lap of the coil) to separate from the rest of the coil 106 using gravity. In other examples, the coil 106 is mounted on the unwind mandrel 108 such that the coil 106 is rotated in the opposite direction, which is known as "over-winding" and discussed in detail below with respect to FIG. 5.

In both the under-winding and over-winding configurations, a passline 116 is defined between the unroll point 114 and the roll gap 126 of the work stand 120. In some examples, the passline 116 extends at a non-zero angle relative to a horizontal plane. In other examples, the passline 116 is substantially parallel to the horizontal plane. FIGS. 1-4 illustrate examples where the passline 116 is substantially parallel to the horizontal plane. In various examples, the unwind mandrel 108 is vertically adjustable such that as the coil 106 unwinds (and the diameter of the coil 106 decreases), the relative angle of the passline 116 to the horizontal plane can be maintained.

Figure 7:
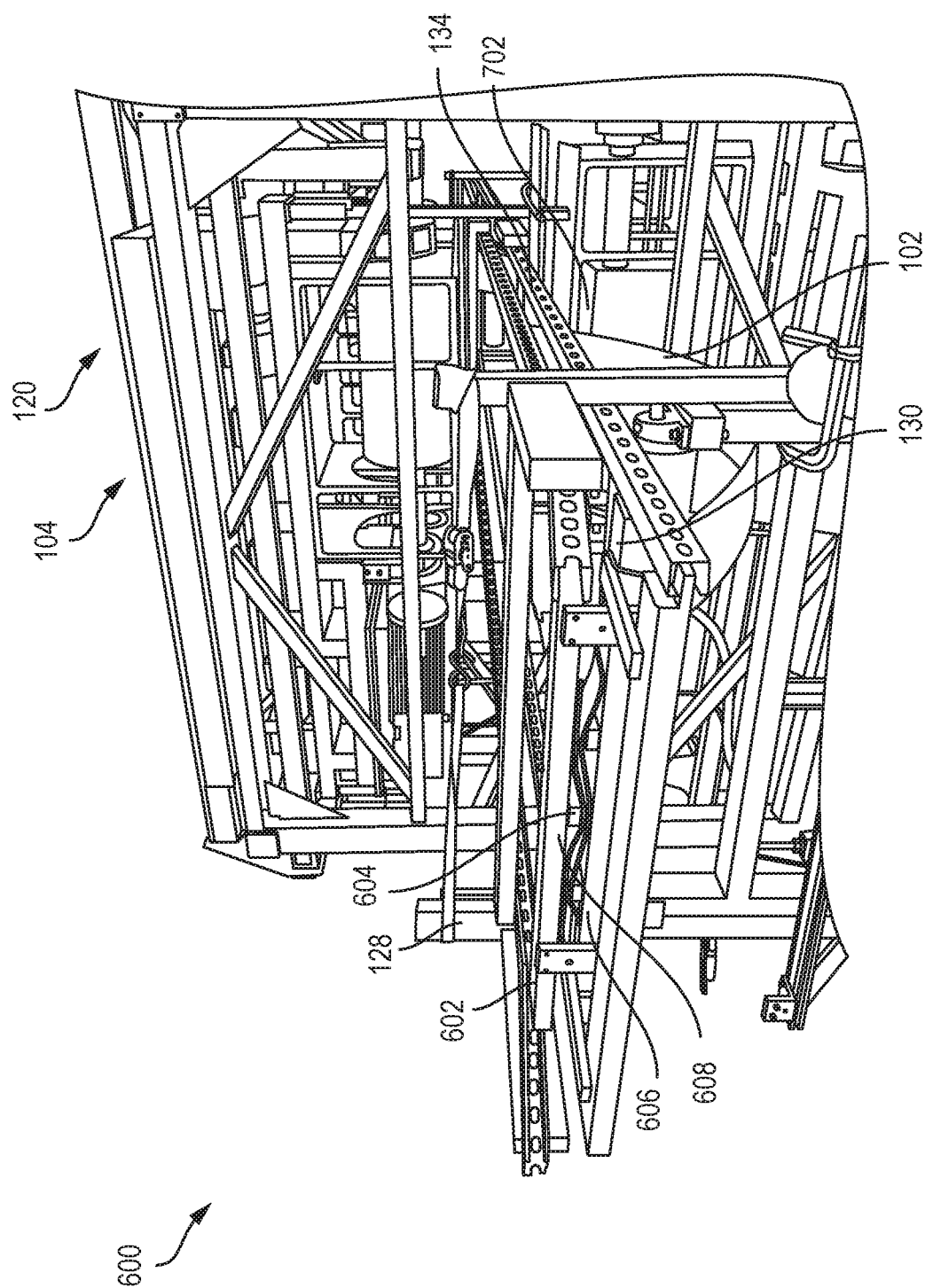
FIG. 7 is another photograph of the system of FIG. 6.
Figure 8:
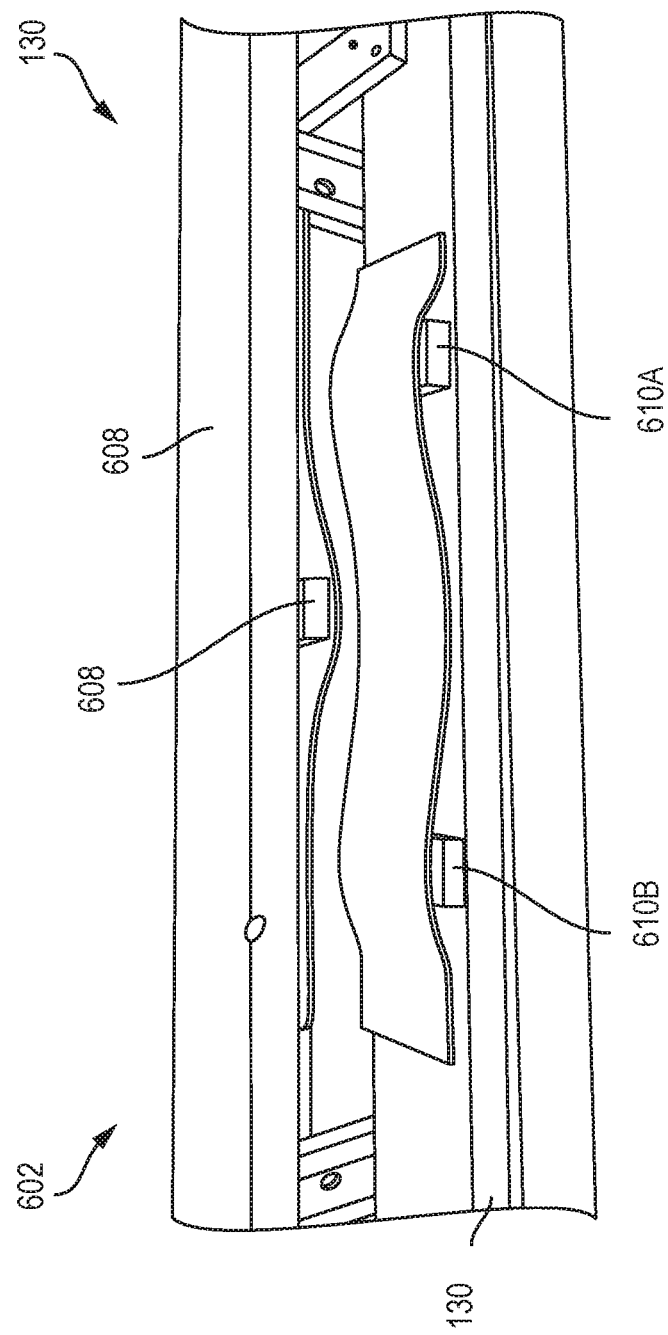
FIG. 8 is a photograph of a gripper of the system of FIG. 6.

As illustrated in FIGS. 1-4, in various examples, the threading system 100 includes a threading carriage 128 that is configured to guide the metal substrate 102 from the coil 106 to the work stand 120 to thread the metal substrate 102 in the roll gap 126. In some cases, the threading carriage 128 is movable along a track 134 that supports the threading carriage 128. In various examples, the threading carriage 128 optionally includes wheels, rollers, sliders, or various other suitable movement mechanisms that allow for movement of the threading carriage 128 along the track 134. As illustrated in FIGS. 1-4, the track 134 extends at least partially between the unwind mandrel 108 and the work stand 120. In some examples, various mechanical movers may move the threading carriage 128 along the track 134. Mechanical movers include, but are not limited to, chains, wires (see, e.g., wires 702 in FIG. 7), rack and pinion, drive motors, robotic arms, or various other suitable devices for moving the threading carriage 128 along the track 134. In various cases, the threading carriage 128 is moved along the track 134 towards the work stand 120 at a linear speed that matches or approximates a rotational speed of the coil 106.

The threading carriage 128 includes a gripper 130, which is configured to selectively grip and release the metal substrate 102 as described in detail below. The gripper 130 may be a gripping wedge (see FIGS. 6-9), a pair of gripping rolls (see FIGS. 10-15), a clamp, or various other suitable mechanisms for selectively gripping and releasing the metal substrate 102. In various examples, the gripper 130 is configured to grip the metal substrate 102 proximate to a leading edge 132 of the metal substrate 102 as it unwound from the coil 106. In some examples as illustrated in FIGS. 1-4, the gripper 130 is configured to grip the metal substrate 102 at a position along the metal substrate 102 that is offset from the leading edge 132 of the metal substrate 102. By gripping the metal substrate 102 at the offset position from the leading edge 132, the threading carriage 128 can thread the leading edge 132 of the metal substrate into the roll gap 126 without contacting the work rolls 122 (or other portions of the work stand 120) (see FIG. 3). In certain examples, the gripper 130 may grip the metal substrate 102 at a position that is about 500 mm from the leading edge 132. In various examples, the offset position may be adjusted as desired to be greater than or less than 500 mm. In other examples, the gripper 130 may grip the metal substrate 102 at or near the leading edge 132 such that the leading edge 132 may be into the roll gap 126 without the carriage 128 contacting the work rolls 122.

Figure 16:
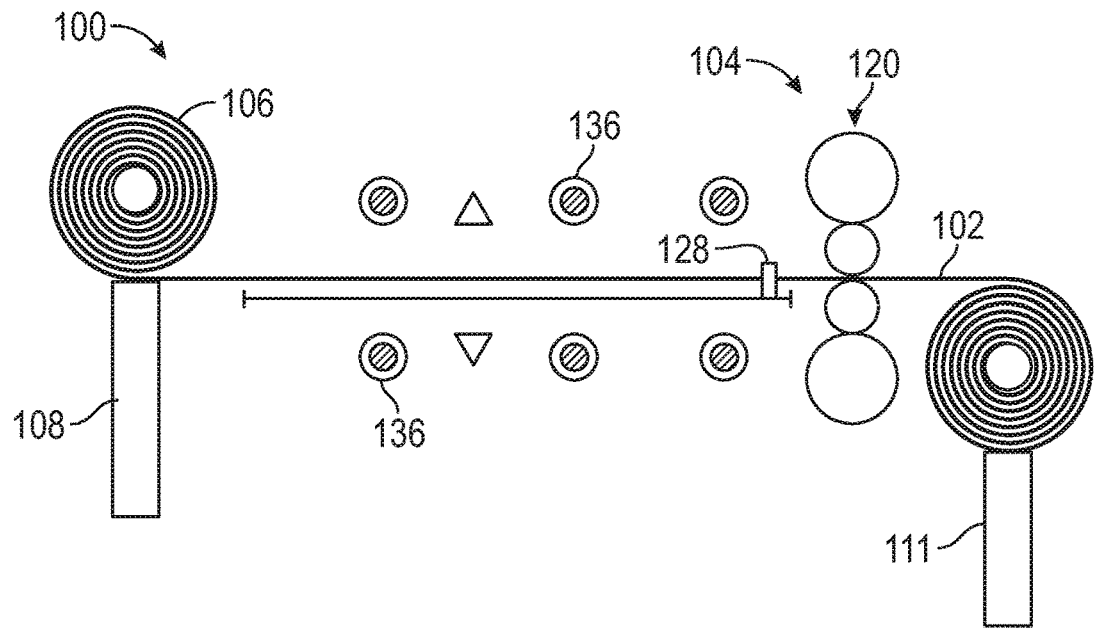
FIG. 16 is a schematic of a system for threading a coil on a mill according to aspects of the present disclosure.

Once the threading carriage 128 guides the metal substrate 102 and the leading edge 132 is threaded into the roll gap 126, the gripper 130 may release the metal substrate 102. In some examples, a release on the gripper 130 causes the gripper 130 to release the metal substrate 102. The release may be various suitable release mechanisms that may be automatic (e.g., spring loaded hooks, pins, clips, clasps, or other suitable automatic release mechanisms) or manual (e.g., mechanisms that require an operator). As one example, the release may be an automatic release that is triggered by a triggering device when the leading edge 132 is threaded into the roll gap 126. In some cases, such as where the gripper 130 includes gripping rolls, the gripping rolls could continue to grip the metal substrate 102 after the leading edge 132 is threaded into the roll gap 126 and the gripping rolls are at their maximum position downstream (e.g., the gripping rolls are at a position proximate to the work stand 120. In such cases, the gripping rolls may rotate and further help thread the metal substrate 102. In certain examples, the gripping rolls may continue to thread the metal substrate 102 during open bite threading where the work rolls 122 are open and do not "bite" the metal substrate 102 during threading. In other examples, the threading carriage 128 continues to grip the metal substrate 102 after the metal substrate 102 is threaded into the roll gap. In certain examples, the threading carriage 128 may disengage from the metal substrate 102 when the leading edge of the metal substrate is gripped by a recoiler 111 (see FIG. 16).

Figure 4:
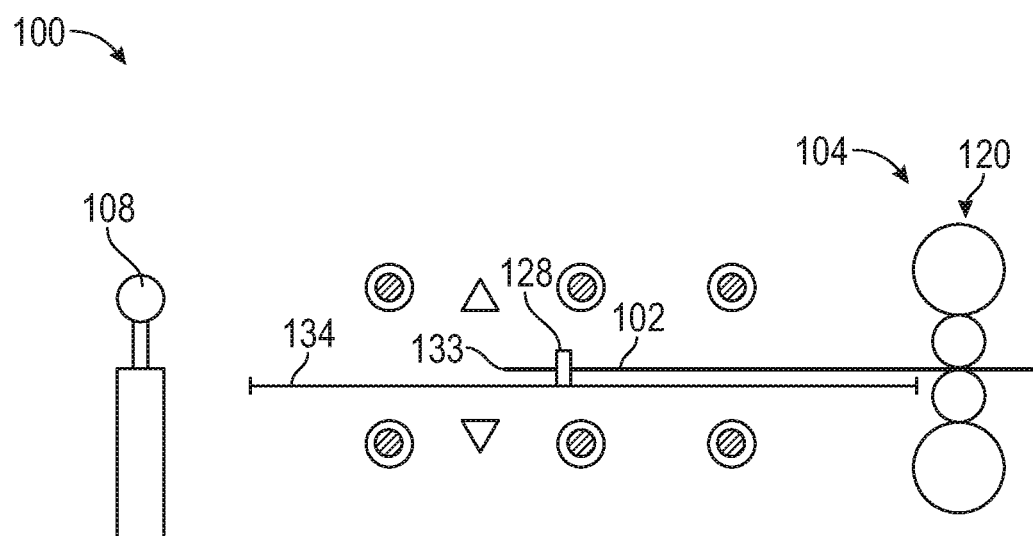
FIG. 4 is another schematic of the system of FIG. 1.

In certain optional examples, when the metal substrate 102 is completely unrolled from the unwind mandrel 108, the gripper 130 may grip the metal substrate 102 at a position along the metal substrate 102 that is offset from or at the trailing edge 133 of the metal substrate 102 (see FIG. 4). By gripping the metal substrate 102 at or proximate to the trailing edge 133, the threading carriage 128 may guide the trailing edge 133 to the work stand 120. Once the threading carriage guides the metal substrate 102 such that the trailing edge 133 is proximate to the roll gap 126, the gripper 130 may release the metal substrate 102.

As illustrated in FIGS. 1-4, in some examples, the threading system 100 includes at least one rotating magnet 136 that is configured to support/stabilize the metal substrate 102 as it is guided to the work stand 120 without contacting the metal substrate 102. In various examples, a plurality of rotating magnets 136 are provided. In some examples, the rotating magnets 136 are positioned below or above the passline 116. In other examples, some rotating magnets 136 are positioned below the passline 116 and other rotating magnets 136 are positioned above the passline 116. In certain examples, a rotating magnet set includes a pair of vertically aligned rotating magnets 136 on opposite sides of the passline 116. In some cases, each rotating magnet 136 of the rotating magnet set can be positioned equidistance from the passline 116 to avoid pulling the metal substrate 102 away from the passline 116. In some examples, the rotating magnets 136 of the rotating magnet set rotate in opposite directions, although they need not in other examples. In various other examples, rotating magnets 136 above the passline 116 may be offset from rotating magnets 136 below the passline 116.

Each rotating magnet 136 can include one or more permanent magnets or electromagnets. As the metal substrate 102 passes along the passline 116 above or below a rotating magnet 136 or between a pair of rotating magnets 136, the rotating magnets 136 apply a vertical repulsive force to the metal substrate 102. The vertical repulsive force from the rotating magnets 136 provides vertical stabilization and allows the metal substrate 102 to pass over and/or between the rotating magnets 136 without contacting the rotating magnets 136 (e.g., to float along the passline 116).

In some examples with a plurality of rotating magnets 136, a downstream rotating magnet (i.e., a rotating magnet 136 closer to the work stand 120) can offset tension induced by an upstream rotating magnet 136 (i.e., a rotating magnet 136 closer to the coil 106). In various examples, tension can be offset by the downstream rotating magnet 136 by rotating it in a direction that is opposite the direction of rotation of the upstream rotating magnet 136. As one example, an upstream rotating magnet 136 may rotate in a downstream direction (e.g., in a clockwise direction in FIG. 1) while a downstream rotating magnet 136 may rotate in an upstream direction (e.g., in a counter-clockwise direction in FIG. 1).

In some examples, the plurality of rotating magnets 136 are also positioned and configured to heat the metal substrate 102 so it has a desired roll entry temperature as it enters the work stand 120. In some cases, the metal substrate has a roll entry temperature between approximately 20° C. and approximately 600° C., although various other temperatures may be used depending on particular application.

In some examples, a lap slippage monitor or other suitable monitor may be provided to optically monitor (or monitor through other suitable techniques) the metal substrate 102 between the coil 106 and the rotating magnet 136 to ensure that no tension or no slippage in the coil is generated in the metal substrate 102.

In some optional examples, the threading system 100 includes at least one quench 138. In other examples, the quench 138 may be omitted (see, e.g., FIG. 10). The number and location of the quenches 138 may be varied as desired. For example, in some cases, as illustrated in FIGS. 1-4, the threading system 100 includes two quenches 138, with one quench 138 above the passline 116 and one quench 138 below the passline 116. In the example illustrated in FIGS. 1-4, the quenches 138 are positioned between rotating magnets 136. In other examples, the quenches 138 may be at various other locations and may have fewer or additional quenches 138. The quenches 138 are configured to spray or otherwise reduce the temperature of the metal substrate 102 as it is fed to the work stand 120. The quenches 138 may reduce the temperature of the metal substrate 102 down to various temperatures depending on whether the mill 104 is a hot mill, cold mill, or warm mill. In some examples, the quenches 138 also reduce or offset any nominal heating in the metal substrate 102 that may be caused by the rotating magnets 136. In some cases, the quenches 138 add stiffness to the metal substrate 102.

In some cases, using quenches 138 and/or rotating magnets 136 to float and optionally heat the metal substrate 102 optimizes the thermal treatment of the metal substrate 102 during threading to help increase recovery, meaning that less of the metal substrate 102 is lost to scrap or discarded due to unwanted and/or undesired metallurgical properties in the metal substrate and/or various other defects in the metal substrate that might otherwise occur. During processing, the head or tail of the metal substrate 102 may not be at the target temperature. Through heating and quenching, the head and/or tail of the metal substrate 102 may be better controlled to be at the target temperature (e.g., and have the desired metallurgical properties), which increases the recovery of the metal substrate 102 (i.e., less of the metal substrate 102 is lost to scrap or discarded due unwanted and/or undesired metallurgical properties as well various other defects in the metal substrate).

In various examples, after a first quench 138, the rotating magnets 136 may be used to increase the back tension towards the mill 104 at each rotating magnet 136. This may improve the rolling conditions in the roll gap 126 as well as the quench conditions because the metal substrate 102 may be held more stable on the passline 116 in the quench zones.

Figure 5:
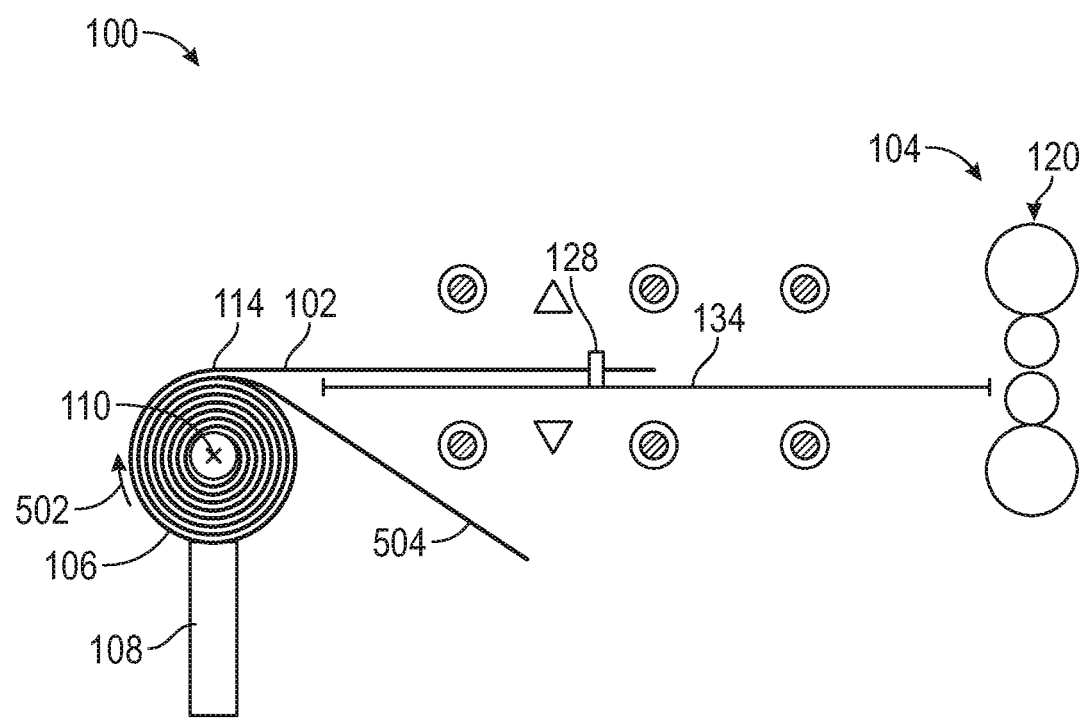
FIG. 5 is a schematic of a system for threading a coil on a mill according to aspects of the present disclosure.
Figure 6:
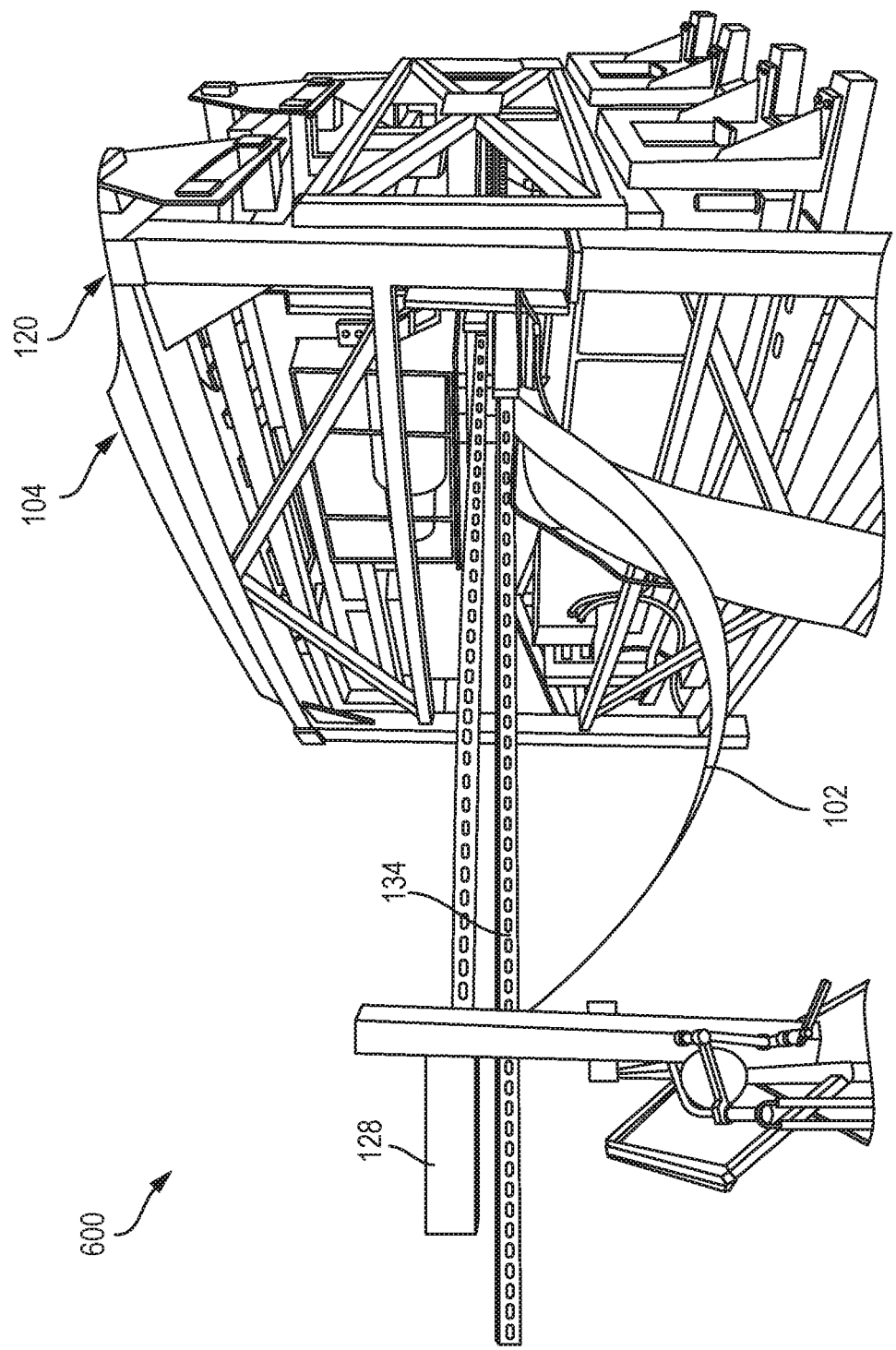
FIG. 6 is a photograph of a system for threading a coil on a mill according to aspects of the present disclosure.

FIG. 5 illustrates an example of the threading system 100 where the coil 106 is mounted on the unwind mandrel 108 such that the coil 106 is rotated in the direction indicated by arrow 502 to unwind the metal substrate 102. Unwinding in the direction indicated by arrow 502 is generally known as "over-winding," and in such configurations, the unroll point 114 is generally above the axis of rotation 110.

In some optional examples, a foil layer 504 is wound with the metal substrate 102 within the coil 106 to separate adjacent layers of the metal substrate 102. The foil layer 504 may be included to prevent interlap scratches in the coil 106, which may occur during decoiling. In various examples, the foil layer 504 may be included with coils 106 at elevated temperatures, although they may also be included with coils 106 at various other temperatures. In certain examples, the foil layer 504 includes a metal having a higher melting point than a melting point of the metal substrate 102. In some cases, the foil layer 504 may have a hardness that is less than a hardness of the metal substrate 102. In the example illustrated in FIG. 5, the metal substrate 102 includes aluminum or an aluminum alloy, and the foil layer 504 includes steel.

While the foil layer 504 may be included with the metal substrate 102 within the coil 106, the foil layer 504 is removed during threading and uncoiling of the metal substrate 102. In various examples, uncoiling the metal substrate 102 in the over-winding direction may facilitate separating a foil layer from the coil 106 as illustrated in FIG. 5, although in other examples, the foil layer may be separated from the coil 106 in the under-winding configuration.

FIGS. 6-9 illustrate an example of a threading system 600 that is similar to the threading system 100. In the threading system 600, the gripper 130 of the threading carriage 128 includes a gripping wedge 602. The gripping wedge 602 includes a base 606 and a top 608. The top 608 is positionable relative to the base 606 between a gripping position (see FIG. 6) to grip the metal substrate 102 and a release position (see FIGS. 8 and 9) to release the metal substrate 102. Optionally, in some cases, the gripping wedge 602 includes guides 610A-B, which may facilitate the initial positioning of the metal substrate 102 relative to the threading carriage 128.

Figure 9:
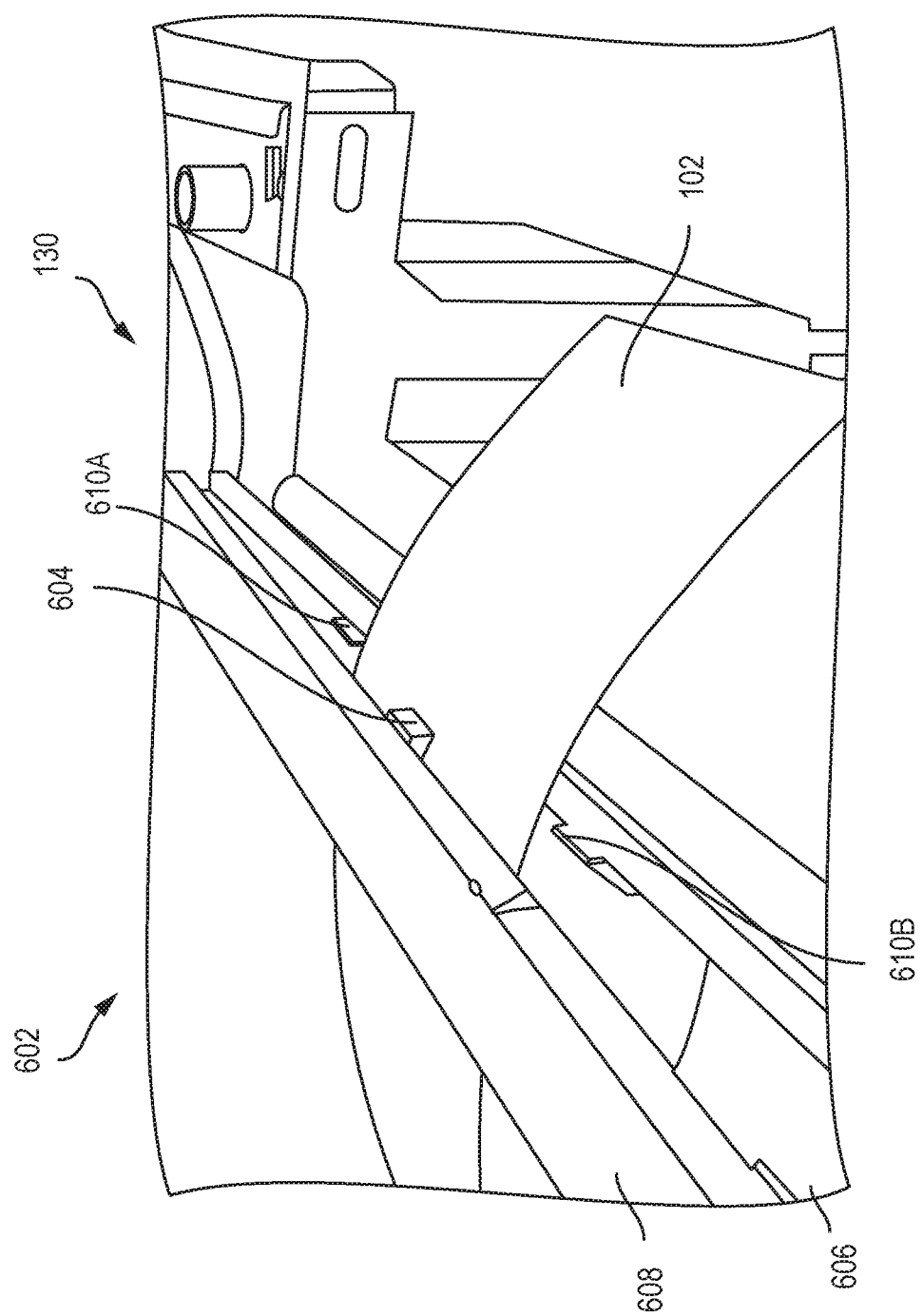
FIG. 9 is another photograph of the gripper of FIG. 8 gripping a metal substrate.
Figure 10:
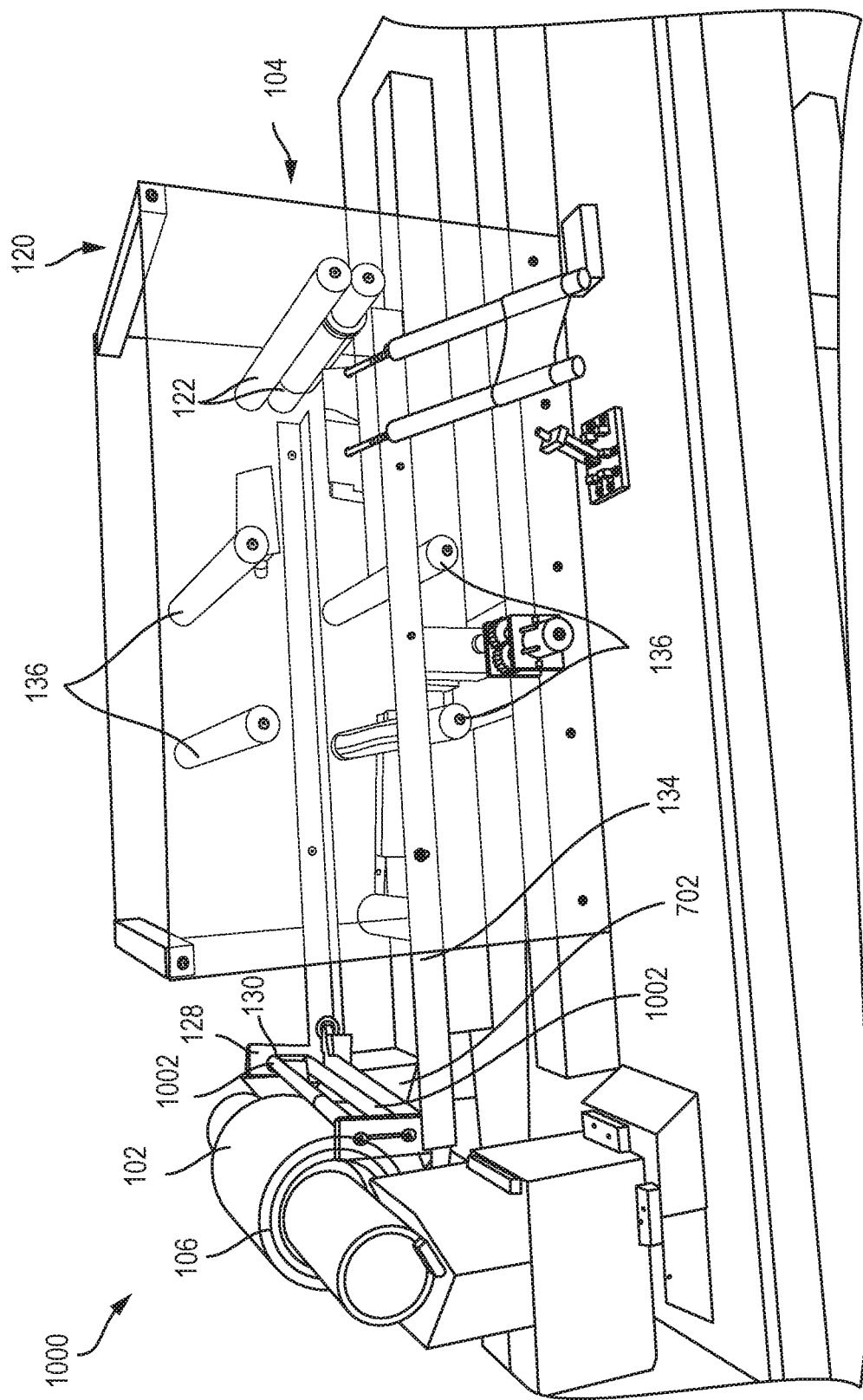
FIG. 10 is a photograph of a system for threading a coil on a mill according to aspects of the present disclosure.
Figure 11:
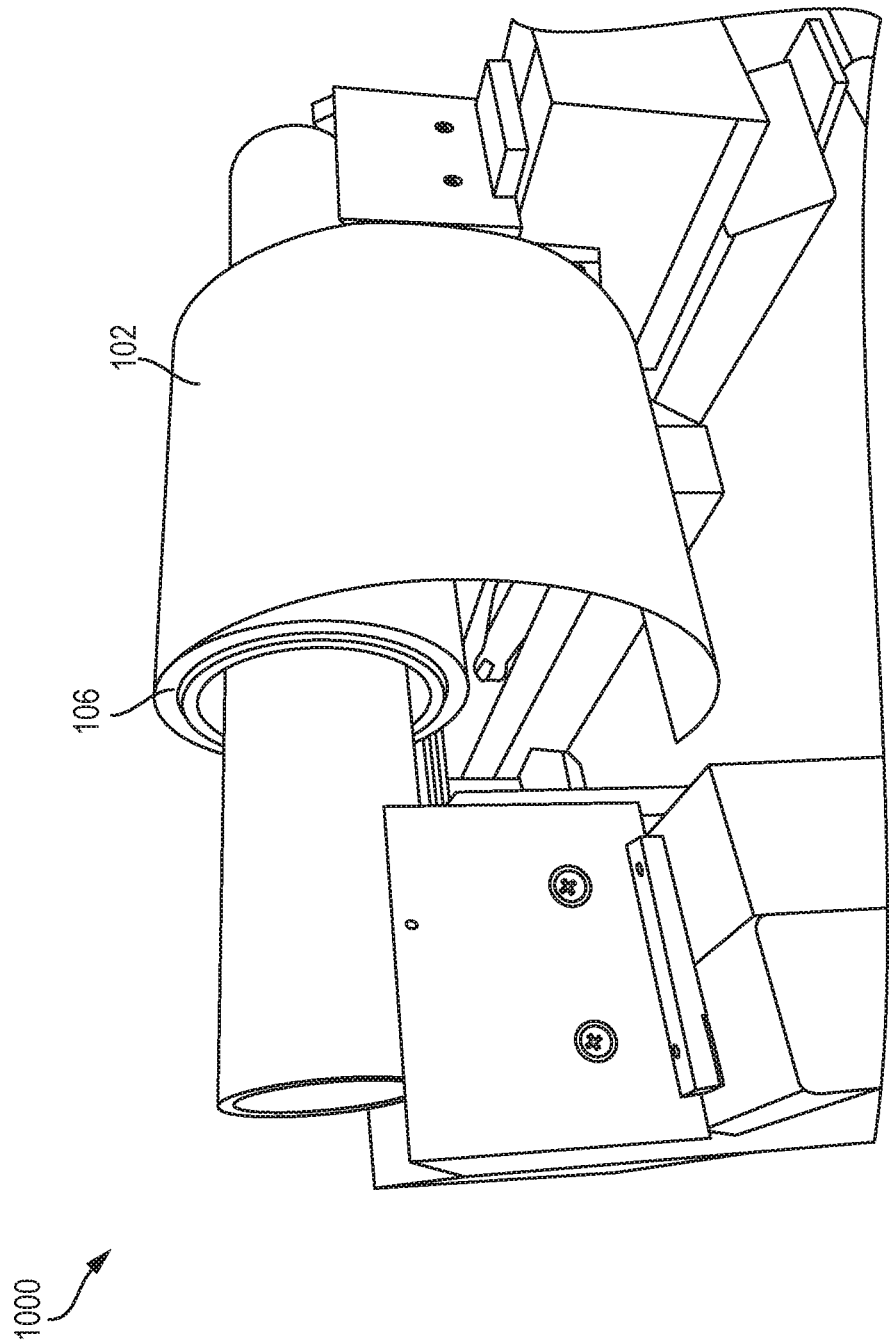
FIG. 11 is another photograph of the system of FIG. 10.

In some examples, the gripping wedge 602 includes at least one ridge 604 that is configured to crimp the metal substrate 102 while the gripping wedge 602 grips the metal substrate 102 and impart at least one lateral curvature across a width of the metal substrate 102. The ridge 604 may be on the base 606 or the top 608 of the gripping wedge 602. In various examples, any number of ridges 604 may be provided on the base 606 and/or the top 608. In some examples, the number of ridges 604 may be varied depending on a desired lateral curvature pattern. For example, ridges 604 may be provided to impart a single curve, a plurality of curves (e.g., pattern similar to a sine wave), or any other pattern as desired. In some examples, a height of the ridges 604, which is a distance that the ridge 604 projects from the base 606 and/or top 608, may be adjusted to adjust a radius of curvature of the lateral curvature. In certain examples, the height of one ridge 604 may be different from a height of another ridge 604. In some examples, the lateral curvature imparted by the gripping wedge 602 may allow for the leading edge 132 of the metal substrate 102 to remain closer to the passline 116 (i.e., not to sag as illustrated in FIG. 9), which may facilitate threading of the leading edge 132 into the roll gap 126.

Figure 18:
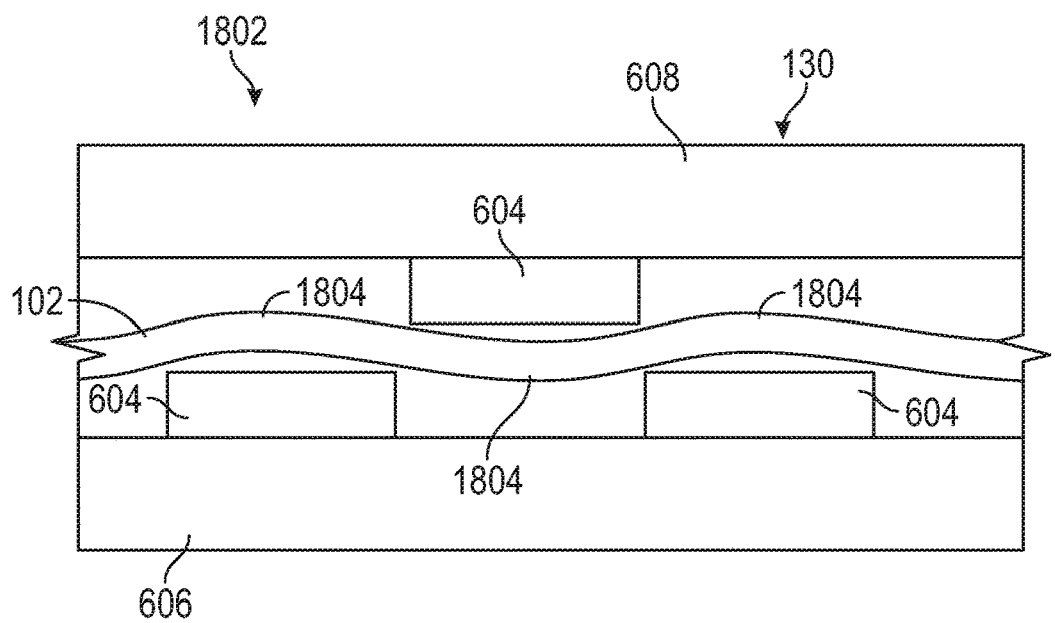
FIG. 18 is a schematic of a gripper gripping a metal substrate according to aspects of the present disclosure.

FIG. 18 illustrates a non-limiting example of a gripping wedge 1802 that is similar to the gripping wedge 602 and includes three ridges 604—two ridges 604 on the base 606 and one ridge 608 on the top 608. As illustrated, the gripping wedge 1802 grips the metal substrate 108 and imparts three lateral curvatures 1804 across a width of the metal substrate 102.

FIGS. 10-15 illustrate an example of a threading system 1000 that is similar to the threading system 100. In the threading system 1000, the gripper 130 of the threading carriage 128 includes gripping rolls 1002. In some examples, the gripping rolls 1002 are vertically aligned and are vertically movable between a release position (see FIG. 10) and a gripping position (see FIG. 13). The threading system 1000 also includes an optional pinch roll 1202. The pinch roll 1202 is configured to direct the metal substrate 102 from the unwind mandrel 108 to the threading carriage 128. In various examples, the pinch roll 1202 is configured to rotate at a rotational speed that matches a linear speed of movement of the metal substrate 102.

Figure 17:
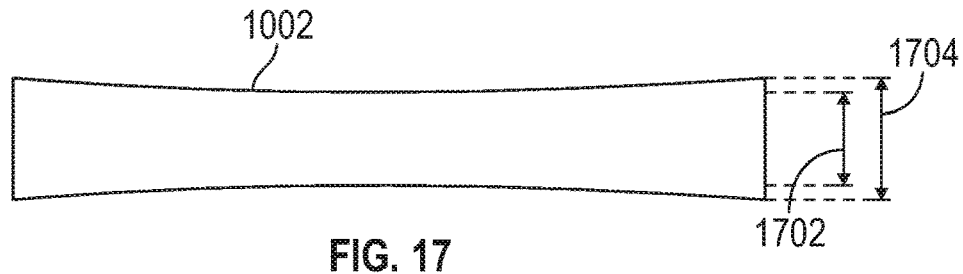
FIG. 17 is a schematic of a gripping roll for a system for threading a coil on a mill according to aspects of the present disclosure.

In certain examples, the gripping rolls 1002 are configured to add stiffness to the metal substrate 102 similar to the gripping wedge 602 by crimping the metal substrate 102 with the gripping rolls 1002 such that the metal substrate includes at least one lateral curvature across the width of the metal substrate. In certain examples, the gripping rolls 1002 may crimp the metal substrate 102 through bending of the gripping rolls 1002. In some examples, the gripping rolls 1002 have a profile suitable for crimping the metal substrate. As one non-limiting example, the gripping rolls 1002 may have a variable radius along the axis of the rolls 1002. For example, FIG. 17 illustrates an example of a gripping roll 1002 where the gripping roll 1002 includes at least two different diameters 1702 and 1704. Gripping rolls 1002 having various other diameter profiles or shapes may be used as desired. In other examples, one or more vertically adjustable gripping rolls 1002 may be provided across the strip width, and each gripping roll 1002 may be vertically adjusted to provide the desired crimp in the metal substrate. In other examples, multiple narrow gripping rolls 1002 may be provided on the top and/or bottom of the metal substrate, and the gripping rolls 1002 may be vertically shifted to give the lateral curvature in the strip. Various other suitable mechanisms for crimping the metal substrate 1002 with or without the gripping rolls 1002 may be utilized.

A method of threading the metal substrate 102 on the rolling mill 104 is also disclosed. Referring to FIG. 1, in some examples, the method includes receiving the coil 106 of the metal substrate 102. The coil 106 may be at an elevated temperature, which may be greater than 450° C., although it need not be. For example, in other cases, the coil 106 may be at room temperature, or various other temperatures less than 450° C. In certain examples, a temperature of the coil 106 may at least partially depend on the material of the metal substrate 102.

The method includes uncoiling the metal substrate 102 from the coil 106. In some examples, the coil 106 includes a weld that secures the leading edge 132 of the metal substrate 102 against the coil 106. In such cases, uncoiling the metal substrate 102 includes breaking the weld with a peeler knife or other suitable device. In some examples, uncoiling the metal substrate 102 includes uncoiling the metal substrate 102 while the coil 106 is at the elevated temperature. In other examples, uncoiling the metal substrate 102 includes uncoiling the metal substrate 102 while the coil 106 is at any temperature. In various examples, the coil 106 is mounted on the unwind mandrel 108 such that uncoiling the metal substrate 102 includes under-winding the metal substrate 102 from the coil 106 (see FIGS. 1-4). In other examples, the coil 106 is mounted on the unwind mandrel 108 such that uncoiling the metal substrate 102 includes over-winding the metal substrate 102 from the coil 106 (see FIG. 5). In certain examples, if the coil 106 includes the foil layer 504 between adjacent layers of the metal substrate 102, uncoiling the metal substrate 102 from the coil 106 includes separating the foil layer 504 from the metal substrate 102 (see FIG. 5). In some examples, uncoiling the metal substrate 102 also includes maintaining a predetermined feed angle of a passline 116 relative to the roll gap 126 by adjusting a vertical position of the unwind mandrel 108, which vertically adjusts the position of the coil 106.

The method also includes guiding the metal substrate 102 to the work stand 120 of the rolling mill 104. In some examples, guiding the metal substrate 102 to the work stand 120 includes guiding the metal substrate 102 to a threading carriage (such as the threading carriage 128) and gripping the metal substrate 102 with a gripper (such as gripper 130) of the threading carriage 128 (see FIG. 1). After the threading carriage 128 grips the metal substrate 102, the method includes moving the threading carriage 128 towards the work stand 120 (see FIGS. 1-4). In various examples, the threading carriage 128 grips the metal substrate 102 at a position that is offset from the leading edge 132 of the metal substrate such that when the leading edge 132 is fed into the roll gap 126 of the work stand 120, the threading carriage 128 is spaced apart from work rolls 122 of the work stand 120 (see FIG. 3)

Figure 12:
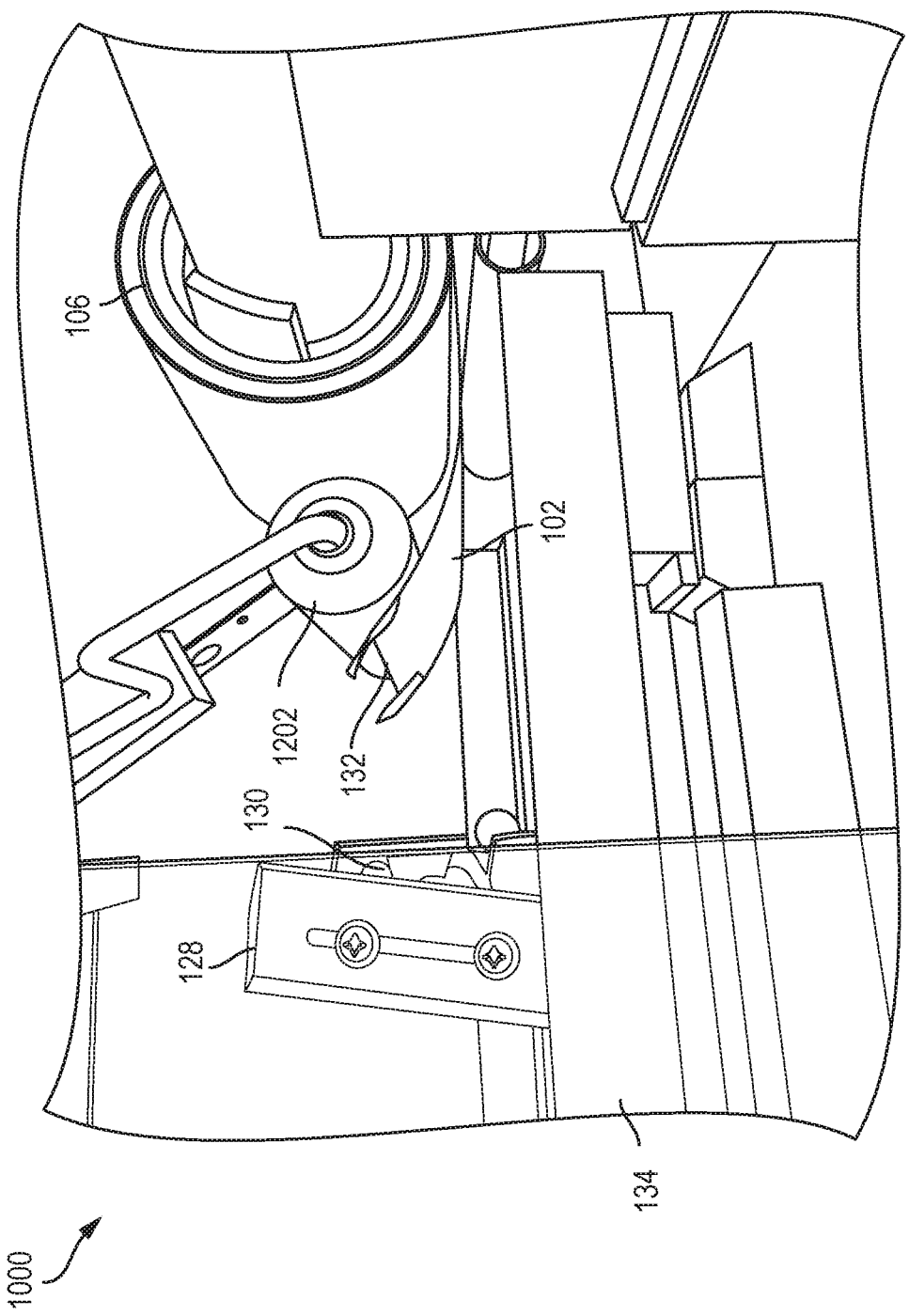
FIG. 12 is another photograph of the system of FIG. 10.
Figure 13:
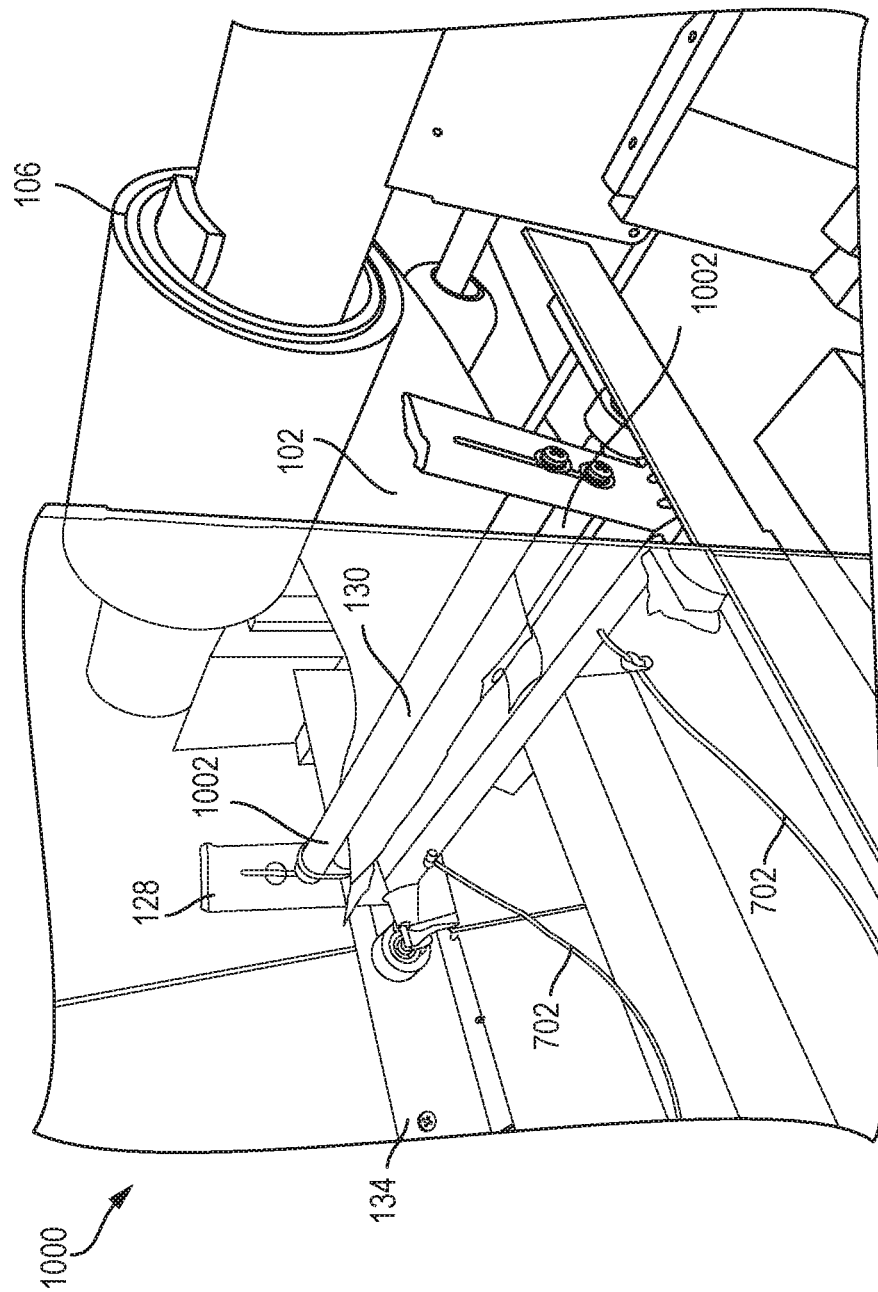
FIG. 13 is another photograph of the system of FIG. 10.
Figure 14:
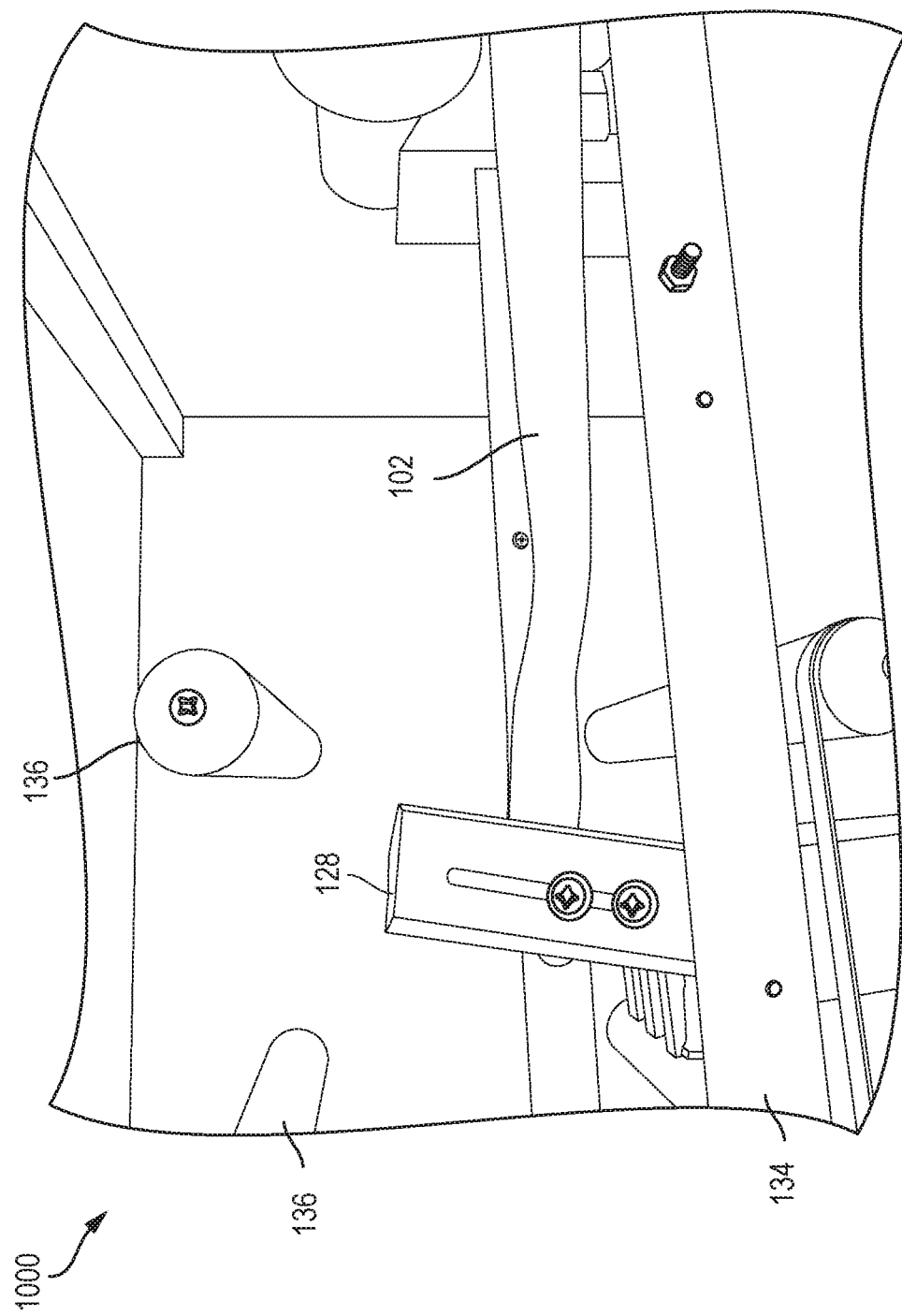
FIG. 14 is another photograph of the system of FIG. 10.
Figure 15:
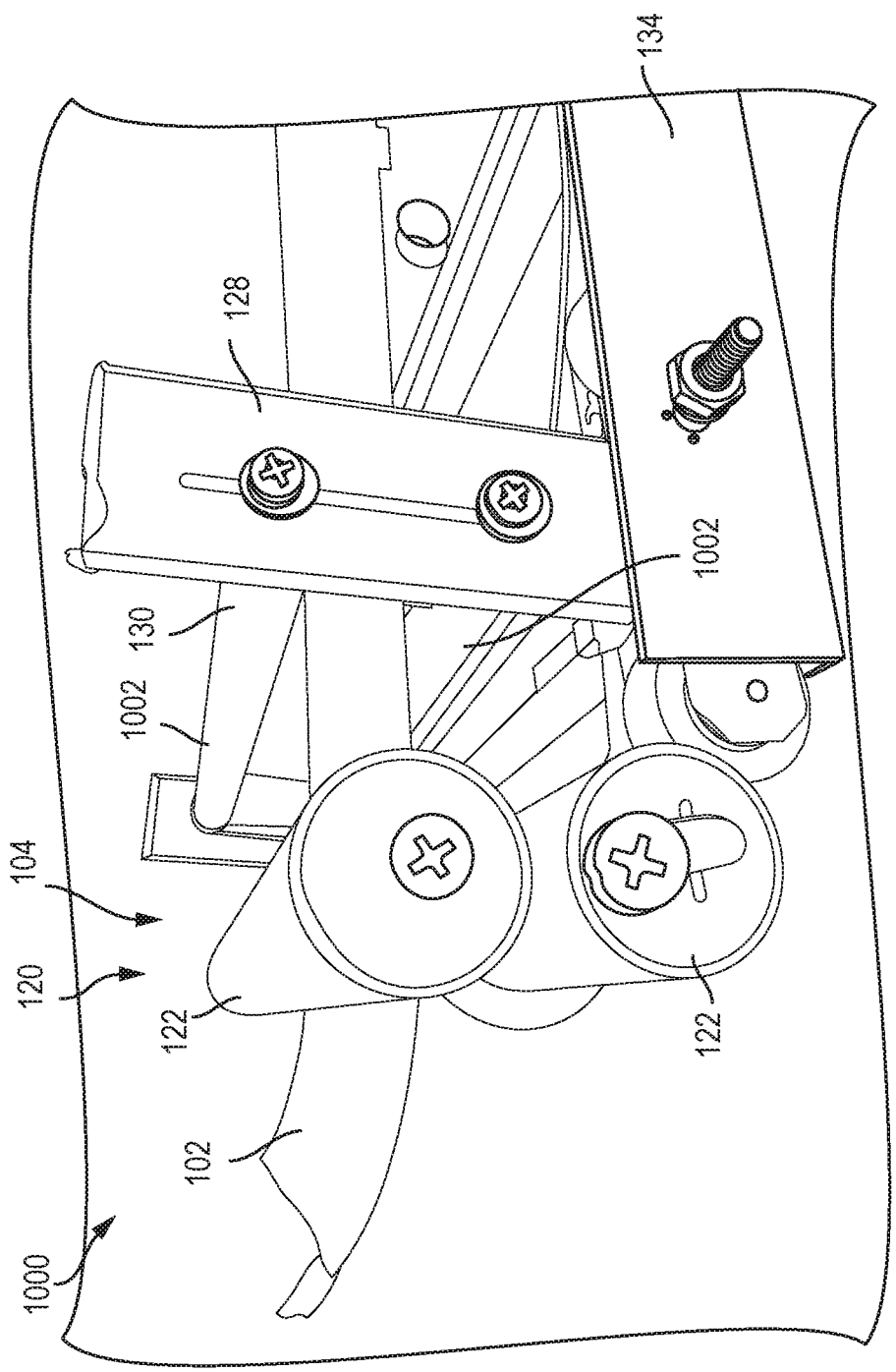
FIG. 15 is another photograph of the system of FIG. 10.

In certain optional examples, the metal substrate 102 is guided to the threading carriage 128 with a pinch roll 1202 (see FIG. 12). In some of these examples, the pinch roll 1202 is rotated at a rotational speed that matches a linear speed of movement of the metal substrate 102 as it uncoils from the coil 106.

In various examples, the threading carriage 128 includes the gripping wedge 602, and gripping the metal substrate 102 includes directing the metal substrate 102 through the gripping wedge 602 while the gripping wedge 602 is in the release position (see FIG. 9). After the metal substrate 102 is positioned relative to the gripping wedge 602, the method includes closing the gripping wedge 602 to the gripping position (see FIG. 7) to grip the metal substrate 102. In some cases, the gripping wedge 602 grips the metal substrate 102 at a position that is offset from the leading edge 132 of the metal substrate 102 (see FIG. 9). In various aspects, gripping the metal substrate 102 with the gripping wedge 602 includes crimping the metal substrate 102 with the gripping wedge 602 to impart at least one lateral curvature across the width of the metal substrate 102.

According to other examples, the threading carriage 128 includes a pair of gripping rolls 1002. In these examples, gripping the metal substrate 102 includes directing the metal substrate 102 between the gripping rolls 1002 and gripping the metal substrate 102 with the gripping rolls 1002 at a position that is offset from the leading edge 132 of the metal substrate 102.

In certain examples, moving the threading carriage 128 towards the work stand 120 includes mechanically moving the threading carriage 128 along the track 134. In various cases, the threading carriage 128 is moved towards the work stand 120 at a linear speed that matches a rotational speed of the coil 106.

In some examples, the method includes releasing the metal substrate 102 from the threading carriage 128 when the leading edge 132 of the metal substrate 102 is at or proximate the work stand 120. According to various examples, the method optionally includes gripping the metal substrate 102 proximate to the trailing edge 133 of the metal substrate 102 with the gripper 130, guiding the trailing edge 133 to the work stand 120, and disengaging the threading carriage 128 from the metal substrate 102 when the trailing edge 133 of the metal substrate 102 is proximate to the work stand 120.

In various cases, the method includes supporting a portion of the metal substrate 102 between the threading carriage 128 and the coil 106 with at least one rotating magnet 136 without contacting the metal substrate 102. In some cases, the method also optionally includes controlling a tension of the metal substrate 102 with the at least one rotating magnet 136. In some cases, the method includes controlling a tension of the metal substrate 102 with at least two rotating magnets 136 by rotating an upstream rotating magnet 136 in a first direction and rotating a downstream rotating magnet 136 rotates in a second direction that is opposite the first direction. In some aspects, the method optionally includes quenching the metal substrate 102 with at least one quench 138 while guiding the metal substrate 102 to the work stand 120.

In some cases, the disclosed systems and methods allow for a metal substrate 102 to be threaded from a coil 106 into a work stand 120 with low enough tension to avoid slippage in the coil 106 and to avoid or reduce surface markings on a surface of the metal substrate 102. In some cases, as mentioned above, the coil 106 is rotated at the same linear speed as the movement of the metal substrate 102 to avoid generating tension or slippage in the coil 106. The disclosed systems and methods also allow a coil at an elevated temperature to be rolled at elevated temperatures (e.g., greater than 500° C.) while reducing or eliminating the risk of damage to the surface of the metal substrate 102. In other examples, the metal substrate 102 and/or coil may not be at elevated temperatures. For example, the metal substrate may be at room temperature or various other temperatures less than 500° C.

It is noted that while the threading systems are described with respect to threading the leading edge of the metal substrate, they could also be used for guiding the trailing edge of the metal substrate during tailing out. For example, during tailing out, the threading systems could be used to control the tension in the metal substrate and the position of the metal substrate relative to the passline. In certain examples, using the threading systems during tailing out may produce less scratches or other defects on the metal substrate, may provide better temperature control (through magnetic heating or quenching), and may allow for higher recovery of the metal substrate at the trailing edge. In certain examples when the threading systems are used for tailing out, the threading system may include a second gripper that moves along the same track 134 or other guide of the gripper 130. In other examples, the same gripper 130 may be used to guide the trailing edge during tailing out. In some of these examples, the gripper 130 may return to a position proximate to the unwind mandrel 108 to engage the trailing edge of the metal substrate.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A method of threading a metal substrate on a rolling mill comprising: receiving a coil of the metal substrate; uncoiling the metal substrate from the coil; and guiding the metal substrate to a work stand of the rolling mill with a threading system.

EC 2. The method of any of the preceding or subsequent example combinations, wherein guiding the metal substrate to the work stand of the rolling mill comprises directing the metal substrate into a roll gap defined between an upper work roll and a lower work roll of the work stand.

EC 3. The method of any of the preceding or subsequent example combinations, wherein guiding the metal substrate to the work stand comprises: guiding the metal substrate to a threading carriage of the threading system; gripping the metal substrate with the threading carriage; and moving the threading carriage towards the work stand.

EC 4. The method of any of the preceding or subsequent example combinations, wherein the threading carriage comprises a pair of gripping rolls, and wherein gripping the metal substrate with the threading carriage comprises directing the metal substrate between the pair of gripping rolls and gripping the metal substrate with the gripping rolls at a position that is offset from a leading edge of the metal substrate.

EC 5. The method of any of the preceding or subsequent example combinations, wherein the position of the pair of gripping rolls is offset from the leading edge such that when the leading edge is fed into a roll gap of the work stand, the threading carriage is spaced apart from work rolls of the work stand.

EC 6. The method of any of the preceding or subsequent example combinations, wherein the threading carriage comprises a gripping wedge, and wherein gripping the metal substrate with the threading carriage comprises directing the metal substrate through the gripping wedge and closing the gripping wedge on the metal substrate at a position that is offset from a leading edge of the metal substrate to grip the metal substrate.

EC 7. The method of any of the preceding or subsequent example combinations, further comprising adding stiffness to the metal substrate by closing the gripping wedge and crimping the metal substrate with the gripping wedge such that the metal substrate comprises at least one lateral curvature across a width of the metal substrate.

EC 8. The method of any of the preceding or subsequent example combinations, wherein adding stiffness to the metal substrate comprises crimping the metal substrate with the gripping wedge such that the metal substrate comprises a plurality of lateral curvatures across the width of the metal substrate.

EC 9. The method of any of the preceding or subsequent example combinations, wherein the threading carriage grips the metal substrate proximate to a leading edge of the metal substrate, and wherein the method further comprises: disengaging the threading carriage from the metal substrate when the leading edge of the metal substrate is proximate the work stand; gripping the metal substrate proximate to a trailing edge of the metal substrate proximate an uncoiler; and disengaging the threading carriage from the metal substrate when the trailing edge of the metal substrate is proximate to the work stand.

EC 10. The method of any of the preceding or subsequent example combinations, further comprising quenching the metal substrate with at least one quench sprayer while guiding the metal substrate to the work stand.

EC 11. The method of any of the preceding or subsequent example combinations, further comprising controlling a tension of the metal substrate with at least one rotating magnet while guiding the metal substrate to the work stand.

EC 12. The method of any of the preceding or subsequent example combinations, wherein the at least one rotating magnet is positioned below a passline of the metal substrate.

EC 13. The method of any of the preceding or subsequent example combinations, wherein the at least one rotating magnet comprises a pair of vertically aligned rotating magnets, and wherein guiding the metal substrate comprises guiding the metal substrate between the pair of vertically aligned rotating magnets.

EC 14. The method of any of the preceding or subsequent example combinations, further comprising controlling tension, controlling a metal substrate temperature, guiding the metal substrate, modifying a passline of the metal substrate, or non-contact supporting the metal substrate with at least one rotating magnet.

EC 15. A system for threading a metal substrate on a rolling mill comprising: a threading carriage comprising a gripper configured to grip a metal substrate; and a track extending between an unwind mandrel and a work stand of the rolling mill, wherein the threading carriage is movable along the track, and wherein the threading carriage is configured to guide and apply tension to the metal substrate between the unwind mandrel and the work stand.

EC 16. The system of any of the preceding or subsequent example combinations, wherein the gripper comprises a pair of gripping rolls configured to grip the metal substrate at a position that is offset from a leading edge of the metal substrate.

EC 17. The system of any of the preceding or subsequent example combinations, wherein the gripper comprises a gripping wedge configured to close on the metal substrate at a position that is offset from a leading edge of the metal substrate.

EC 18. The system of any of the preceding or subsequent example combinations, wherein the gripping wedge is further configured to crimp the metal substrate such that the metal substrate comprises at least one lateral curvature across a width of the metal substrate.

EC 19. The system of any of the preceding or subsequent example combinations, further comprising at least at least one rotating magnet between the unwind mandrel and the work stand.

EC 20. The system of any of the preceding or subsequent example combinations, wherein the at least one rotating magnet comprises a pair of vertically aligned rotating magnets, and the metal substrate is configured to pass between the pair of vertically aligned rotating magnets.

EC 21. A method of threading a metal substrate on a rolling mill comprising: receiving a coil of the metal substrate at an elevated temperature, wherein the elevated temperature is greater than 450° C.; uncoiling the metal substrate from the coil while the coil is at the elevated temperature; and guiding the metal substrate to a work stand of the rolling mill. In other examples, the coil of the metal substrate is received at room temperature or at a hot temperature less than 450° C.

EC 22. The method of any of the preceding or subsequent example combinations, wherein the elevated temperature is from 450° C. to 560° C.

EC 23. The method of any of the preceding or subsequent example combinations, wherein the metal substrate comprises aluminum, and wherein the elevated temperature is less than a melting point of the metal substrate.

EC 24. The method of any of the preceding or subsequent example combinations, wherein uncoiling the metal substrate comprises under-winding the metal substrate from the coil.

EC 25. The method of any of the preceding or subsequent example combinations, wherein uncoiling the metal substrate comprises over-winding the metal substrate from the coil.

EC 26. The method of any of the preceding or subsequent example combinations, wherein the coil of the metal substrate comprises a foil layer between adjacent layers of the metal substrate within the coil, and wherein uncoiling the metal substrate from the coil comprises separating the foil layer from the metal substrate before guiding the metal substrate to the work stand.

EC 27. The method of any of the preceding or subsequent example combinations, wherein the foil layer comprises a metal having a higher melting point than a melting point of the metal substrate.

EC 28. The method of any of the preceding or subsequent example combinations, wherein the foil layer comprises steel.

EC 29. The method of any of the preceding or subsequent example combinations, wherein the foil layer has a hardness that is less than a hardness of the metal substrate.

EC 30. The method of any of the preceding or subsequent example combinations, wherein uncoiling the metal substrate comprises over-winding the metal substrate. In other examples, uncoiling the metal substrate includes under-winding the metal substrate.

EC 31. The method of any of the preceding or subsequent example combinations, wherein uncoiling the metal substrate comprises breaking a weld between a leading edge of the metal substrate and the coil of the metal substrate.

EC 32. The method of any of the preceding or subsequent example combinations, wherein the work stand comprises an upper work roll and a lower work roll, wherein the upper and lower work rolls define a roll gap, and wherein guiding the metal substrate to the work stand of the rolling mill comprises directing the metal substrate into the roll gap.

EC 33. The method of any of the preceding or subsequent example combinations, wherein uncoiling the metal substrate comprises uncoiling the metal substrate such that a passline of the metal substrate from an unroll point of the metal substrate is at a predetermined feed angle relative to the roll gap.

EC 34. The method of any of the preceding or subsequent example combinations, wherein the passline of the metal substrate is substantially parallel to a horizontal axis.

EC 35. The method of any of the preceding or subsequent example combinations, further comprising maintaining the predetermined feed angle of the passline by adjusting a vertical position of the coil.

EC 36. The method of any of the preceding or subsequent example combinations, wherein guiding the metal substrate to the work stand comprises: guiding the metal substrate to a threading carriage; gripping the metal substrate with the threading carriage; and moving the threading carriage towards the work stand.

EC 37. The method of any of the preceding or subsequent example combinations, wherein guiding the metal substrate to the threading carriage comprises directing the metal substrate with a pinch roll.

EC 38. The method of any of the preceding or subsequent example combinations, further comprising rotating the pinch roll to match a linear speed of movement of the metal substrate.

EC 39. The method of any of the preceding or subsequent example combinations, wherein the threading carriage comprises a pair of gripping rolls, and wherein gripping the metal substrate with the threading carriage comprises directing the metal substrate between the pair of gripping rolls and gripping the metal substrate with the gripping rolls at a position that is offset from a leading edge of the metal substrate.

EC 40. The method of any of the preceding or subsequent example combinations, wherein the position of the pair of gripping rolls is offset from the leading edge such that when the leading edge is fed into a roll gap of the work stand, the threading carriage is spaced apart from work rolls of the work stand. In certain examples, EC 41. The method of any of the preceding or subsequent example combinations, wherein the threading carriage comprises a gripping wedge, and wherein gripping the metal substrate with the threading carriage comprises directing the metal substrate through the gripping wedge and closing the gripping wedge on the metal substrate at a position that is offset from a leading edge of the metal substrate to grip the metal substrate.

EC 42. The method of any of the preceding or subsequent example combinations, further comprising adding stiffness to the metal substrate by closing the gripping wedge and crimping the metal substrate with the gripping wedge such that the metal substrate comprises at least one lateral curvature across a width of the metal substrate.

EC 43. The method of any of the preceding or subsequent example combinations, wherein the metal substrate comprises a plurality of lateral curvatures across the width of the metal substrate.

EC 44. The method of any of the preceding or subsequent example combinations, wherein moving the threading carriage towards the work stand comprises mechanically moving the threading carriage along a track. In some examples, mechanically moving the threading carriage includes using robotic arms EC 45. The method of any of the preceding or subsequent example combinations, wherein moving the threading carriage comprises moving the threading carriage at a linear speed that matches a rotational speed of the coil.

EC 46. The method of any of the preceding or subsequent example combinations, wherein the threading carriage grips the metal substrate proximate to a leading edge of the metal substrate, and wherein the method further comprises: disengaging the threading carriage from the metal substrate when the leading edge of the metal substrate is at the work stand or past the work stand; gripping the metal substrate proximate to a trailing edge of the metal substrate close to the uncoiler; and disengaging the threading carriage from the metal substrate when the trailing edge of the metal substrate is proximate to the work stand. In some examples, the threading carriage returns to proximate the uncoiler and engages the trailing edge of the metal substrate. In certain examples, a second threading carriage may be used to engage the trailing edge. In various examples with gripping rolls, the roll pair may move the metal substrate close to the rolling mill, and the roll pair may then rotate without opening its gap to drive the strip further, such as into the work stand of the rolling mill, and finally releases the strip when the work stand grips the metal substrate.

EC 47. The method of any of the preceding or subsequent example combinations, further comprising quenching the metal substrate with at least one quench sprayer while guiding the metal substrate to the work stand.

EC 48. The method of any of the preceding or subsequent example combinations, further comprising controlling a tension of the metal substrate with at least one rotating magnet while guiding the metal substrate to the work stand. In some examples, a plurality of rotating magnets are provided. In various examples, the rotating magnets are provided to control tension, control strip temperature, guide the metal substrate, and/or control or modify the passline (e.g., reduce vertical sag or support of the strip).

EC 49. The method of any of the preceding or subsequent example combinations, wherein the at least one rotating magnet is positioned below a passline of the metal substrate.

EC 50. The method of any of the preceding or subsequent example combinations, wherein the at least one rotating magnet comprises a pair of vertically aligned rotating magnets, and wherein guiding the metal substrate comprises guiding the metal substrate between the pair of vertically aligned rotating magnets. In other examples, only bottom rotating magnets may guide the strip.

EC 51. The method of any of the preceding or subsequent example combinations, wherein the pair of vertically aligned rotating magnets rotate in opposite directions.

EC 52. The method of any of the preceding or subsequent example combinations, wherein the at least one rotating magnet comprises a first rotating magnet and a second rotating magnet downstream from the first rotating magnet, and wherein the first rotating magnet rotates in a first direction and the second rotating magnet rotates in a second direction that is opposite the first direction.

EC 53. The method of any of the preceding or subsequent example combinations, further comprising supporting the metal substrate with at least one rotating magnet while guiding the metal substrate to the work stand. In further examples, the method includes controlling tension, controlling strip temperature, guiding the strip, and/or modifying or controlling the passline of the metal substrate with the at least one rotating magnet.

EC 54. A system for threading a metal substrate on a rolling mill comprising: a threading carriage comprising a gripper configured to grip a metal substrate; and a track extending between an unwind mandrel and a work stand of the rolling mill, wherein the threading carriage is movable along the track, and wherein the threading carriage is configured to guide and apply tension to the metal substrate between the unwind mandrel and the work stand.

EC 55. The system of any of the preceding or subsequent example combinations, wherein the gripper is configured to grip the metal substrate while the metal substrate is at an elevated temperature, wherein the elevated temperature is greater than 450° C.

EC 56. The system of any of the preceding or subsequent example combinations, wherein the elevated temperature is from 450° C. to 560° C.

EC 57. The system of any of the preceding or subsequent example combinations, wherein the elevated temperature is less than a melting point of the metal substrate.

EC 58. The system of any of the preceding or subsequent example combinations, further comprising the unwind mandrel.

EC 59. The system of any of the preceding or subsequent example combinations, wherein the unwind mandrel is configured to support a coil of the metal substrate such that the metal substrate uncoils in an under-wind direction.

EC 60. The system of any of the preceding or subsequent example combinations, wherein the unwind mandrel is configured to support a coil of the metal substrate such that the metal substrate uncoils in an over-wind direction.

EC 61. The system of any of the preceding or subsequent example combinations, wherein the unwind mandrel is vertically adjustable in order to control the passline.

EC 62. The system of any of the preceding or subsequent example combinations, further comprising a pinch roll configured to direct the metal substrate from the unwind mandrel to the threading carriage and to rotate at a rotational speed that matches a linear speed of movement of the metal substrate.

EC 63. The system of any of the preceding or subsequent example combinations, wherein the gripper comprises a pair of gripping rolls configured to grip the metal substrate at a position that is offset from a leading edge of the metal substrate. In some examples, the gripping rolls include one or more lateral curvatures (e.g., through bending, variable radii along the axis of the rolls, etc.).

EC 64. The system of any of the preceding or subsequent example combinations, wherein the gripper comprises a gripping wedge configured to close on the metal substrate at a position that is offset from a leading edge of the metal substrate.

EC 65. The system of any of the preceding or subsequent example combinations, wherein the gripping wedge is further configured to crimp the metal substrate such that the metal substrate comprises at least one lateral curvature across a width of the metal substrate in order to control the stiffness of the leading edge.

EC 66. The system of any of the preceding or subsequent example combinations, wherein the gripping wedge is configured to crimp the metal substrate such that the metal substrate comprises a plurality of lateral curvatures across the width of the metal substrate in order to control the stiffness of the leading edge.

EC 67. The system of any of the preceding or subsequent example combinations, further comprising a mechanical mover that is configured to move the threading carriage along the track.

EC 68. The system of any of the preceding or subsequent example combinations, wherein the mechanical mover comprises at least one of a wire, a rack and pinion, a chain, or a drive motor.

EC 69. The system of any of the preceding or subsequent example combinations, wherein the threading carriage further comprises a release configured to release the gripper from the metal substrate when the metal substrate is at the work stand.

EC 70. The system of any of the preceding or subsequent example combinations, further comprising at least one quenching station between the unwind mandrel and the work stand.

EC 71. The system of any of the preceding or subsequent example combinations, further comprising at least at least one rotating magnet between the unwind mandrel and the work stand.

EC 72. The system of any of the preceding or subsequent example combinations, wherein the at least one rotating magnet is positioned below a passline of the metal substrate.

EC 73. The system of any of the preceding or subsequent example combinations, wherein the at least one rotating magnet comprises a pair of vertically aligned rotating magnets, and the metal substrate is configured to pass between the pair of vertically aligned rotating magnets.

EC 74. The system of any of the preceding or subsequent example combinations, wherein the pair of vertically aligned rotating magnets are configured to rotate in opposite directions.

EC 75. The system of any of the preceding or subsequent example combinations, wherein the at least one rotating magnet comprises a first rotating magnet and a second rotating magnet downstream from the first rotating magnet, and wherein the first rotating magnet is configured to rotate in a first direction and the second rotating magnet is configured to rotate in a second direction that is opposite the first direction.

EC 76. The system of any of the preceding or subsequent example combinations, wherein the at least one rotating magnet is configured to support the metal substrate between the unwind mandrel and the work stand, control tension, control strip temperature, guide the metal substrate, and/or modify or control the passline of the metal substrate.

EC 77. The system of any of the preceding or subsequent example combinations, wherein the gripper comprises a pair of gripping rolls configured to grip the metal substrate.

EC 78. The method of any of the preceding or subsequent example combinations, further comprising adding stiffness to the metal substrate by adding a diameter profile along a length of a gripping roll such that the metal substrate comprises at least one lateral curvature across a width of the metal substrate.

EC 79. The method of any of the preceding or subsequent example combinations, wherein the threading carriage grips the metal substrate proximate to a leading edge of the metal substrate, and wherein the method further comprises: disengaging the threading carriage from the metal substrate when the leading edge of the metal substrate is gripped by a recoiler configured to rewind the metal substrate into a coil, such as after the work stand.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:

1. A method of threading a metal substrate on a rolling mill comprising:
   receiving a coil of the metal substrate;
   uncoiling the metal substrate from the coil;
   guiding the metal substrate to a work stand of the rolling mill with a threading system, wherein guiding the metal substrate to the work stand comprises:
   guiding the metal substrate to a threading carriage of the threading system;
   gripping the metal substrate with the threading carriage; and
   moving the threading carriage towards the work stand, wherein the threading carriage comprises a gripping wedge, and wherein gripping the metal substrate with the threading carriage comprises directing the metal substrate through the gripping wedge and closing the gripping wedge on the metal substrate at a position that is offset from a leading edge of the metal substrate to grip the metal substrate, and wherein the method further comprises adding stiffness to the metal substrate by closing the gripping wedge and crimping the metal substrate with the gripping wedge such that the metal substrate comprises at least one lateral curvature across a width of the metal substrate.

2. The method of claim 1, wherein adding stiffness to the metal substrate comprises crimping the metal substrate with the gripping wedge such that the metal substrate comprises a plurality of lateral curvatures across the width of the metal substrate.

3. The method of claim 1, wherein the threading carriage grips the metal substrate proximate to a leading edge of the metal substrate, and wherein the method further comprises:

disengaging the threading carriage from the metal substrate when the leading edge of the metal substrate is proximate the work stand;

gripping the metal substrate proximate to a trailing edge of the metal substrate proximate an uncoiler; and disengaging the threading carriage from the metal substrate when the trailing edge of the metal substrate is proximate to the work stand.

4. The method of claim 1, further comprising quenching the metal substrate with at least one quench sprayer while guiding the metal substrate to the work stand.

5. The method of claim 1, further comprising controlling tension, controlling a metal substrate temperature, guiding the metal substrate, modifying a passline of the metal substrate, or non-contact supporting the metal substrate with at least one rotating magnet.

6. A system for threading a metal substrate on a rolling mill comprising:

a threading carriage comprising a gripper configured to grip a metal substrate; and a track extending between an unwind mandrel and a work stand of the rolling mill, wherein the threading carriage is movable along the track, and wherein the threading carriage is configured to guide and apply tension to the metal substrate between the unwind mandrel and the work stand, wherein the gripper comprises a gripping wedge configured to close on the metal substrate at a position that is offset from a leading edge of the metal substrate, and wherein the gripping wedge is further configured to crimp the metal substrate such that the metal substrate comprises at least one lateral curvature across a width of the metal substrate.

7. The system of claim 6, further comprising at least at least one rotating magnet between the unwind mandrel and the work stand.

8. The system of claim 7, wherein the at least one rotating magnet comprises a pair of vertically aligned rotating magnets, and the metal substrate is configured to pass between the pair of vertically aligned rotating magnets.

* * * * *